(12) United States Patent
Drasny et al.

(10) Patent No.: US 10,216,881 B2
(45) Date of Patent: *Feb. 26, 2019

(54) PHASE ALGEBRA FOR ANALYSIS OF HIERARCHICAL DESIGNS

(71) Applicant: International Business Machines Corporation, Armonk, NY (US)

(72) Inventors: Gabor Drasny, Poughkeepsie, NY (US); Gavin B. Meil, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/791,082

(22) Filed: Oct. 23, 2017

(65) Prior Publication Data

US 2018/0107776 A1    Apr. 19, 2018

Related U.S. Application Data

(63) Continuation of application No. 14/734,912, filed on Jun. 9, 2015, now Pat. No. 9,798,844, which is a
(Continued)

(51) Int. Cl.
G06F 17/50    (2006.01)

(52) U.S. Cl.
CPC ........ *G06F 17/5045* (2013.01); *G06F 17/504* (2013.01); *G06F 17/5022* (2013.01);
(Continued)

(58) Field of Classification Search
CPC ............. G06F 17/5022; G06F 17/5031; G06F 17/504; G06F 17/5045
(Continued)

(56) References Cited

U.S. PATENT DOCUMENTS 5,210,700 A    5/1993 Tom
5,452,239 A    9/1995 Dai et al.
(Continued)

FOREIGN PATENT DOCUMENTS

WO    02080046    10/2002

OTHER PUBLICATIONS

"U.S. Appl. No. 11/547,532 FAI—OfficeAction Summary", dated Jun. 9, 2016, 9 pages.
(Continued)

*Primary Examiner* — Phallaka Kik
(74) *Attorney, Agent, or Firm* — DeLizio Law, PLLC

(57) ABSTRACT

A design tool can implement phase algebra based design evaluation to evaluate a circuit design with a compact representation of waveforms without simulating the individual waveforms. The tool can determine whether module instances of a register level circuit design share a common usage, each instance being associated with a mapping. Two instances share a common usage if a sequence of signal transition representations received by the first instance can be mapped using a first mapping to the same common sequence of signal transition representations as a mapping of another sequence of signal transition representations received by the second instance using a second mapping. A result sequence of signal transition representations was generated by a previous propagation of the common sequence through the common usage. If the two instances share the common usage, the result sequence is mapped to an output sequence for the second instance using the second mapping.

9 Claims, 13 Drawing Sheets

Related U.S. Application Data continuation of application No. 14/631,539, filed on Feb. 25, 2015, now Pat. No. 9,916,407, which is a continuation-in-part of application No. 14/547,953, filed on Nov. 19, 2014, said application No. 14/631,539 is a continuation-in-part of application No. 14/547,820, filed on Nov. 19, 2014, said application No. 14/631,539 is a continuation-in-part of application No. 14/327,658, filed on Jul. 10, 2014, now Pat. No. 9,251,304.

(60) Provisional application No. 61/912,345, filed on Dec. 5, 2013.

(52) U.S. Cl.
CPC ...... *G06F 17/5031* (2013.01); *G06F 17/5036* (2013.01); *G06F 17/5059* (2013.01); *G06F 2217/62* (2013.01); *G06F 2217/84* (2013.01)

(58) Field of Classification Search
USPC .............. 716/106, 107, 108, 111; 703/2, 16
See application file for complete search history.

(56) References Cited

U.S. PATENT DOCUMENTS

| | | |
|---|---|---|
| 5,835,380 A | 11/1998 | Roethig |
| 5,862,149 A | 1/1999 | Carpenter et al. |
| 6,083,269 A | 7/2000 | Graef et al. |
| 6,175,946 B1 | 1/2001 | Ly et al. |
| 6,377,094 B1 | 4/2002 | Carley |
| 6,654,715 B1 | 11/2003 | Iwashita |
| 6,952,825 B1 | 10/2005 | Cockx et al. |
| 7,073,146 B2 | 7/2006 | Sarwary et al. |
| 7,080,365 B2 | 7/2006 | Broughton et al. |
| 7,089,518 B2 | 8/2006 | Bair et al. |
| 7,106,115 B2 | 9/2006 | Carley et al. |
| 7,107,557 B2 | 9/2006 | Iwanishi |
| 7,124,342 B2 | 10/2006 | Wang et al. |
| 7,139,988 B2 | 11/2006 | Chard et al. |
| 7,181,706 B2 | 2/2007 | Greenberg et al. |
| 7,243,322 B1 | 7/2007 | Ly et al. |
| 7,251,794 B2 | 7/2007 | Blanco et al. |
| 7,283,944 B2 | 10/2007 | Tsai et al. |
| 7,299,436 B2 | 11/2007 | Chu et al. |
| 7,333,926 B2 | 2/2008 | Schuppe |
| 7,356,789 B2 | 4/2008 | Ly et al. |
| 7,437,701 B1 | 10/2008 | Dutra et al. |
| 7,454,728 B2 | 11/2008 | Ly et al. |
| 7,478,346 B2 | 1/2009 | Hsu et al. |
| 7,484,192 B2 | 1/2009 | Ja et al. |
| 7,484,196 B2 | 1/2009 | Ja et al. |
| 7,562,244 B2 | 7/2009 | Wielage |
| 7,594,200 B2 | 9/2009 | Eisner et al. |
| 7,627,844 B2 | 12/2009 | Rahmat et al. |
| 7,877,717 B2 | 1/2011 | Chu et al. |
| 7,882,473 B2 | 2/2011 | Baumgartner et al. |
| 7,979,820 B1 | 7/2011 | Patzer et al. |
| 7,996,827 B2 | 8/2011 | Vorbach et al. |
| 8,069,024 B1 | 11/2011 | Croix |
| 8,271,918 B2 | 9/2012 | Kwok et al. |
| 8,352,235 B1 | 1/2013 | Lin et al. |
| 8,407,636 B2 | 3/2013 | Iwashita |
| 8,434,047 B1 | 4/2013 | Jiang et al. |
| 8,438,516 B2 | 5/2013 | Ly et al. |
| 8,438,517 B2 | 5/2013 | Appleton et al. |
| 8,448,111 B2 | 5/2013 | Mneimneh et al. |
| 8,533,541 B2 | 9/2013 | Iwashita |
| 8,914,761 B2 | 12/2014 | Ly et al. |
| 8,935,642 B1 | 1/2015 | Bhardwaj et al. |
| 8,977,995 B1 | 3/2015 | Arora et al. |
| 9,026,978 B1 | 5/2015 | Liu et al. |
| 9,223,916 B2 | 12/2015 | Dilullo et al. |
| 9,251,304 B2 | 2/2016 | Drasny et al. |
| 9,798,844 B2 * | 10/2017 | Drasny ............... G06F 17/5045 |
| 9,916,407 B2 * | 3/2018 | Drasny ............... G06F 17/5045 |
| 2002/0152060 A1 | 10/2002 | Tseng |
| 2003/0192018 A1 | 10/2003 | Baumgartner et al. |
| 2004/0060024 A1 | 3/2004 | Bednar et al. |
| 2004/0078767 A1 | 4/2004 | Burks et al. |
| 2005/0268269 A1 | 12/2005 | Coiley |
| 2006/0022729 A1 | 2/2006 | Carley et al. |
| 2007/0168893 A1 | 7/2007 | Watanabe et al. |
| 2007/0174805 A1 | 7/2007 | Hsu et al. |
| 2008/0072188 A1 | 3/2008 | Ja et al. |
| 2009/0013307 A1 | 1/2009 | Raghavan et al. |
| 2009/0055668 A1 | 2/2009 | Fernsler et al. |
| 2009/0106183 A1 | 4/2009 | Estan et al. |
| 2009/0112555 A1 | 4/2009 | Boerstler et al. |
| 2009/0271167 A1 | 10/2009 | Zhu et al. |
| 2010/0031209 A1 | 2/2010 | Luan et al. |
| 2010/0146338 A1 | 6/2010 | Schalick et al. |
| 2010/0199244 A1 | 8/2010 | Kwok et al. |
| 2010/0235759 A1 | 9/2010 | Rice et al. |
| 2011/0113392 A1 | 5/2011 | Subhra et al. |
| 2011/0133806 A1 | 6/2011 | Subramani et al. |
| 2011/0197172 A1 | 8/2011 | Yamamoto et al. |
| 2011/0291769 A1 | 12/2011 | Burstein et al. |
| 2013/0132760 A1 | 5/2013 | Talupuru et al. |
| 2013/0246985 A1 | 9/2013 | Ly et al. |
| 2013/0343441 A1 | 12/2013 | Alfieri |
| 2015/0026654 A1 | 1/2015 | Kwok et al. |
| 2015/0058818 A1 | 2/2015 | Srinivasan et al. |
| 2015/0161309 A1 | 6/2015 | Drasny et al. |
| 2015/0161310 A1 | 6/2015 | Drasny et al. |
| 2015/0161311 A1 | 6/2015 | Drasny et al. |
| 2015/0161312 A1 | 6/2015 | Drasny et al. |
| 2015/0161313 A1 | 6/2015 | Dransy et al. |
| 2015/0161315 A1 | 6/2015 | Meil |
| 2015/0169816 A1 * | 6/2015 | Drasny ............... G06F 17/5045 716/107 |
| 2015/0269296 A1 | 9/2015 | Drasny et al. |
| 2015/0269299 A1 | 9/2015 | Drasny et al. |
| 2015/0370939 A1 | 12/2015 | Drasny et al. |
| 2015/0370940 A1 | 12/2015 | Drasny et al. |
| 2016/0078162 A1 | 3/2016 | Drasny et al. |
| 2016/0188760 A1 | 6/2016 | Drasny et al. |
| 2016/0188785 A1 | 6/2016 | Drasny et al. |
| 2018/0075178 A1 | 3/2018 | Drasny et al. |
| 2018/0082003 A1 | 3/2018 | Drasny et al. |

OTHER PUBLICATIONS

"U.S. Appl. No. 14/274,956 Ex Parte Quayle Action", dated Apr. 10, 2015, 6 pages.

"U.S. Appl. No. 14/327,658 Office Action", dated Apr. 3, 2015, 9 pages.

"U.S. Appl. No. 14/547,532 FAIIP PreInterview Communication", dated Mar. 22, 2016, 7 Pages.

"U.S. Appl. No. 14/547,532 Final Office Action", dated Oct. 26, 2016, 11 pages.

"U.S. Appl. No. 14/547,820 FAIIP—OA Summary", dated May 10, 2016, 10 pages.

"U.S. Appl. No. 14/547,820 Final Office Action", dated Oct. 10, 2017, 9 pages.

"U.S. Appl. No. 14/547,820 Final Office Action", dated Nov. 23, 2016, 9 pages.

"U.S. Appl. No. 14/547,820 Office Action", dated Apr. 26, 2017, 8 pages.

"U.S. Appl. No. 14/547,953 FAIIP—OA Summary", dated May 10, 2016, 12 pages.

"U.S. Appl. No. 14/547,953 Final Office Action", dated Nov. 22, 2016, 9 pages.

"U.S. Appl. No. 14/547,953 Office Action", dated Apr. 20, 2017, 8 pages.

"U.S. Appl. No. 14/560,599 FAIIP PreInterview Communication", dated Apr. 13, 2016, 3 pages.

"U.S. Appl. No. 14/631,539 FAIIP PreInterview Communication", dated May 31, 2016, 24 pages.

(56) References Cited

OTHER PUBLICATIONS

"U.S. Appl. No. 14/631,539 FAI—OfficeAction Summary", dated Nov. 22, 2016, 7 pages.
"U.S. Appl. No. 14/631,539 Final Office Action", dated Jun. 1, 2017, 9 pages.
"U.S. Appl. No. 14/734,912 FAI—OfficeAction Summary", dated Nov. 10, 2016, 11 pages.
"U.S. Appl. No. 14/734,912 FAIIP PreInterview Communication", dated Aug. 29, 2016, 5 pages.
"U.S. Appl. No. 14/734,912 Final Office Action", dated Mar. 24, 2017, 14 pages.
"U.S. Appl. No. 14/840,372 FAI OA Summary", dated Feb. 15, 2017, 3 pages.
"U.S. Appl. No. 14/840,372 FAIIP PreInterview Communication", dated Oct. 20, 2016, 3 pages.
"U.S. Appl. No. 14/840,372 Final Office Action", dated May 18, 2017, 15 pages.
"U.S. Appl. No. 14/840,517 FAIIP PreInterview Communication", dated Jul. 14, 2016, 5 pages.
"U.S. Appl. No. 14/840,517 Final Office Action", dated Jun. 9, 2017, 9 pages.
"U.S. Appl. No. 14/840,517 Office Action", dated Jan. 18, 2017, 12 pages.
"U.S. Appl. No. 14/840,517 Office Action", dated Oct. 10, 2017, 10 pages.
"U.S. Appl. No. 14/840,774 FAI PreInterview Comm.", dated Oct. 18, 2016, 5 pages.
"U.S. Appl. No. 14/840,774 Office Action", dated Apr. 18, 2017, 7 pages.
"U.S. Appl. No. 15/061,532 First Action Interview—Pre Interview", dated Jul. 14, 2017, 5 pages.
"U.S. Appl. No. 15/061,601 First Action Interview—Pre Interview", dated Jul. 17, 2017, 5 pages.
Chakrabarty, et al., "Synthesis of Transparent Circuits for Hierarchical and System-On-A-Chip Test", National Science Foundation under grant No. CCR-9875324. pp. 1-6., 2001, 6 pages.
Cummings, "Clock Domain Crossing (CDC) Design & Verification Techniques Using SystemVerilog", SNUG—2008, 2008, 56 pages.
Czeck, et al., "Reliable Design with Multiple Clock Domains", Conference: Formal Methods and Models for Co-Design, 2006. MEMOCODE '06. Proceedings. Fourth ACM and IEEE International Conference on Source: IEEE Xplore, 2006, 10 pages.
Foulon, "CAD Flow for System on Chip", The 13th International Conference on Microelectronics Rabat, Morocco, pp. 241-244, Oct. 29-31, 2001, Oct. 2001, 4 pages.
Hari, et al., "Automatic Constraint Based Test Generation for Behavioral HDL Models", IEEE Transactions on Very Large Scale Integration (VLSI) Systems, vol. 16, No. 4, pp. 408-421, Apr. 2008, Apr. 2008, 14 pages.
Litterick, "Pragmatic Simulation-Based Verification of Clock Domain Crossing Signals and Jitter using SystemVerilog Assertions", Verilab & DVCon ; https://www.verilab.com/files/sva_cdc_presentation_dvcon2006.pdf, 2006, 6 pages.
Narain, et al., "Clock Domain Crossing Demystified: The Second Generation Solution for CDC Verification", (Real Intent and Sunburst Design white paper), Mar. 13, 2008., 2008, 20 pages.
Ravi, et al., "TAO: Regular Expression-Based Register-Transfer Level Testability Analysis and Optimization", IEEE Transactions on Very Large Scale Integration (VLSI) Systems, vol. 9, No. 5, pp. 824-832, Dec. 2001, Dec. 2001, 9 pages.
Schubert, et al., "Solutions to IBM POWER8 Verification Challenges", IBM J. Res. & Dev., vol. 59, No. 1, Paper 11, Jan. 2015, pp. 11:1-11:17.
Seshadri, et al., "An Integrated Approach to Behavioral-Level Design-For-Testability Using Value-Range and Variable Testability Techniques", International Test Conference, 1999. pp. 858-867., 1999, 10 pages.
Singh, et al., "Generalized Latency-Insensitive Systems for Single-Clock and Multi-Clock Architectures", Design, Automation and Test in Europe Conference and Exhibition, 2004. Proceedings (vol. 2 ), Feb. 2004, pp. 1008-1013.
Srinivas, et al., "Formal Verification of Digital Circuits Using Hybrid Simulation", IEEE Circuits and Devices Magazine, pp. 19-27, Jan. 1988., Jan. 1988, 9 pages.
Suhaib, "Formal Methods for Intellectual Property Composition Across Synchronization Domains", Dissertation submitted to the Faculty of the Virginia Polytechnic Institute and State University, Aug. 29, 2007, 190 pages.
"U.S. Appl. No. 14/547,953 Final Office Action", dated Oct. 24, 2017, 6 pages.
"U.S. Appl. No. 14/840,372 Office Action", dated Dec. 20, 2017, 8 pages.
"U.S. Appl. No. 14/840,774 Final Office Action", dated Nov. 6, 2017, 7 pages.
"U.S. Appl. No. 14/840,372 Final Office Action", dated May 31, 2018, 15 pages.
"U.S. Appl. No. 14/840,517 Final Office Action", dated Apr. 2, 2018, 10 pages.

* cited by examiner

PHASE ALGEBRA FOR ANALYSIS OF HIERARCHICAL DESIGNS

RELATED APPLICATIONS

This application is a continuation of and claims the priority benefit of U.S. application Ser. No. 14/734,912 filed Jun. 9, 2015, which claims priority from and is a continuation of U.S. application Ser. No. 14/631,539 filed Feb. 25, 2015 which claims priority from and is a continuation-in-part of a U.S. patent application Ser. No. 14/327,658, filed on Jul. 10, 2014, entitled "CIRCUIT DESIGN EVALUATION WITH COMPACT MULTI-WAVEFORM REPRESENTATIONS," which is incorporated herein by reference.

This application claims priority from and is a continuation-in-part of a U.S. patent application Ser. No. 14/547,953, filed on Nov. 19, 2014, entitled "CONDITIONAL PHASE ALGEBRA FOR CLOCK ANALYSIS," which is incorporated herein by reference.

This application claims priority from and is a continuation-in-part of a U.S. patent application Ser. No. 14/547,820, filed on Nov. 19, 2014, entitled "CLOCK-GATING PHASE ALGEBRA FOR CLOCK ANALYSIS," which is incorporated herein by reference.

BACKGROUND

Embodiments of the inventive subject matter generally relate to the field of circuit design, and, more particularly, to electronic design automation (EDA) tools to identify potential defects in a register transfer level (RTL) design of a chip or a system on a chip.

EDA tools are used to evaluate chip designs prior to fabrication. The EDA process broadly consists of two steps. The first step is a check of the RTL design logic. The second step is a creation of a physical circuit design from the RTL design. The first step, checking the design logic, can be referred to as RTL design checking. In RTL design checking, a language such as VHDL (Very High Speed Integrated Circuit Hardware Description Language) or Verilog can be used to describe and model the functional behavior of a circuit. RTL design checking itself can be decomposed into two steps. The first step is static checking and the second step is verification, also commonly referred to as dynamic checking. In static checking, the structure of the design is analyzed without simulating the behavior of the design. Conversely, in verification, the design is simulated by applying test patterns or stimulus to the inputs of the design in an attempt to exhaustively identify possible errors. Verification can be an expensive process for a complex chip or system on a chip. Verification can also be inconclusive, since it is often infeasible to apply all possible test patterns to the inputs of a complex design.

Chips and systems on chips continue to increase in complexity, comprising many systems and sub-systems. These systems and sub-systems might comprise multiple clock domains. A clock domain is a set of sequential logic elements, such as transparent latches and flip-flops, and combinational logic associated with these sequential logic elements that are clocked by a common clock or by clocks having a common frequency and a fixed phase relationship. A clock signal causes a change in the state of sequential logic, such as a flip-flop or transparent latch.

SUMMARY

Embodiments of the inventive subject matter include evaluating a circuit design with a compact representation of waveforms without simulating the individual waveforms. A phase algebra based evaluation tool (also referred to as the "tool") can determine whether module instances of a register transfer level circuit design share a common usage, each instance being associated with a mapping. Two instances share a common usage if a sequence of signal transition representations received by the first instance can be mapped using a first mapping to the same common sequence of signal transition representations as a mapping of another sequence of signal transition representations received by the second instance using a second mapping. The common usage is associated with a result sequence of signal transition representations that was generated by a previous propagation of the common sequence through the common usage. If the two instances share the common usage, the result sequence is mapped to an output sequence for the second instance using the second mapping.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes example systems, methods, techniques, instruction sequences and computer program products that embody techniques of the present disclosure. However, it is understood that the described embodiments may be practiced without these specific details. For instance, the syntax employed to implement the disclosure can be varied. Additionally, although illustrations refer to a flip-flop as a fundamental circuit component, embodiments need not include a flip-flop. For example, a circuit model can include transparent latches and an inverter instead of a flip-flop as fundamental circuit components. Additionally, embodiments may implement fewer operations than the operations described herein, while other embodiments might be implemented with more operations than the ones described herein. In other instances, well-known instruction instances, protocols, structures and techniques have not been shown in detail in order not to obfuscate the description.

Modern processors or systems on a chip include multiple components. Identifying as many design defects as possible at the static checking phase of an RTL design check increases the efficiency of the verification process, thereby saving time and money. A circuit design tool can implement a phase algebra based evaluation tool for phase algebra based design evaluation as described herein to efficiently evaluate a circuit design with a compact representation of numerous waveforms without simulating the individual waveforms. Instead of individual waveforms, the phase algebra based design evaluation employs compact representations of a group or set of waveforms. Phase algebra based evaluation constructs representations of a set of waveforms based on relationships among a devised set of functions that account for the various states of a signal over time. Phase algebra based evaluation can efficiently evaluate circuit designs that include hierarchical modules.

Figure 1:
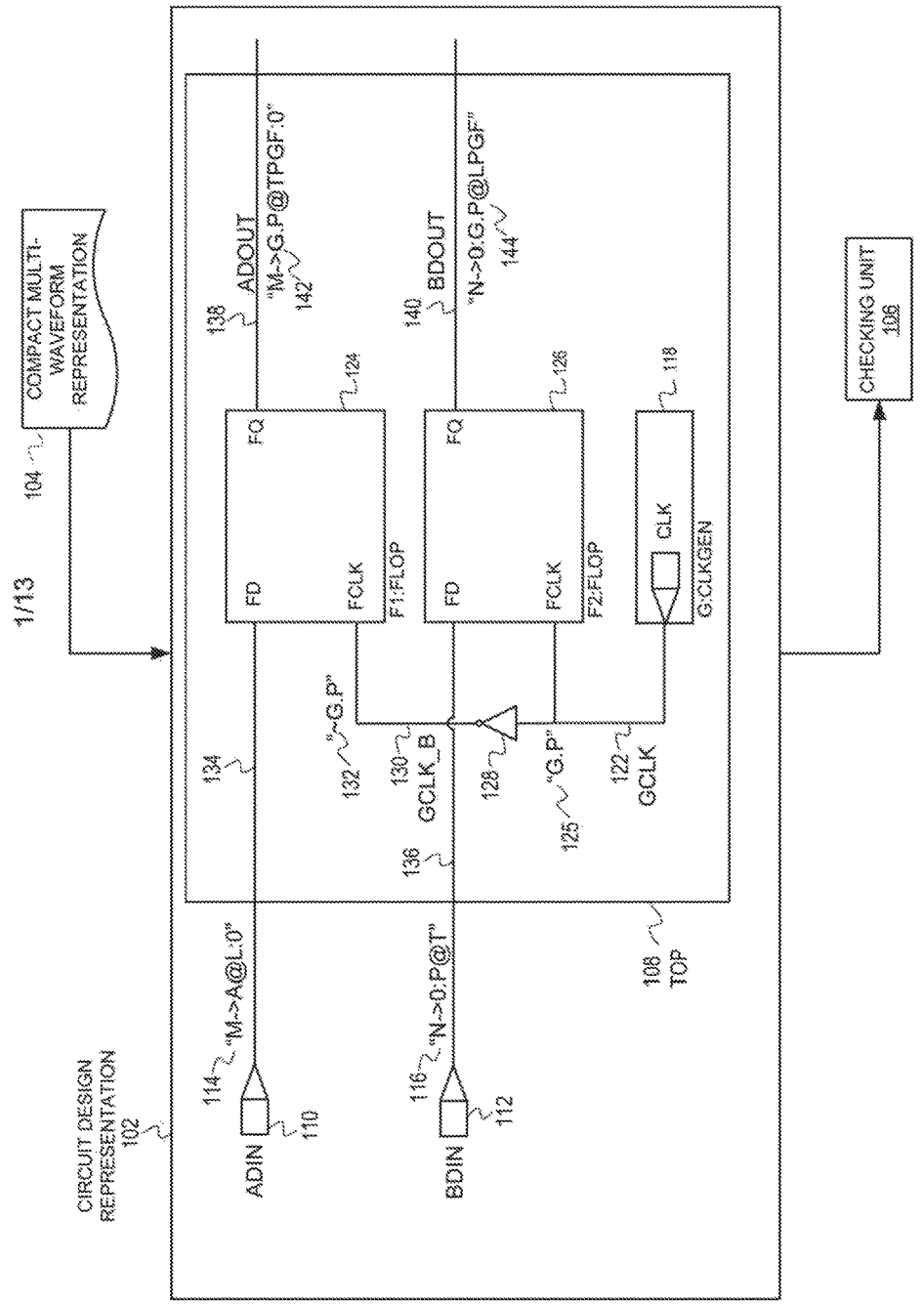
FIG. 1 is a conceptual diagram that depicts example phase algebra based circuit design evaluation with a compact multi-waveform representation.

FIG. 1 is a conceptual diagram that depicts example phase algebra based circuit design evaluation with a compact multi-waveform representation. A circuit design tool performs phase algebra based circuit design evaluation on a machine readable circuit design representation 102 of an RTL circuit design. The circuit design representation 102 includes primary inputs 110 and 112. A primary input is an input to the circuit itself. A primary input is not driven by any component within the circuit. Each of the primary inputs 110 (ADIN) and 112 (BDIN) represents data signals that are provided to the circuit. The circuit design also includes a clock signal GCLK 122 that is generated by a clock generator module instance 118.

FIG. 1 depicts the primary inputs 110 and 112 representative of the primary inputs throughout the circuit design representation 102 for ease of understanding. Various example RTL circuit design components that can be modeled in an RTL circuit design are described in the U.S. patent application Ser. No. 14/327,658, filed on Jul. 10, 2014, entitled "CIRCUIT DESIGN EVALUATION WITH COMPACT MULTI-WAVEFORM REPRESENTATIONS."

A compact multi-waveform representation 104 is provided for the circuit design representation 102. For example, the compact multi-waveform representation 104 is provided in a RTL description using attributes or in a file supplied as input to the circuit design tool. The circuit design tool determines compact multi-waveform representations generated on nets throughout the RTL circuit design dependent upon the components traversed by the circuit design tool. Example compact multi-waveform representations include notations "A" and "A@L". These notations are referred to as "phase tags" herein. This example uses a phase tag to illustrate handling of virtual clocks identified as "A", "P", and "G.P". A virtual clock represents a source of transitions, such as an oscillator, that may be internal or external to the circuit design being evaluated.

In this description, a phase tag and a phase type are distinguished. A phase type is a construct (e.g., variable or notation) that represents a generic virtual clock. Use of a phase type would be sufficient in a design that contemplates a single virtual clock. A phase tag is a construct that identifies a virtual clock. Although a phase tag can be used in a design that contemplates a single virtual clock, the utility of the phase tag becomes apparent when multiple virtual clocks are being considered, such as a virtual clock "A" and a virtual clock "P". In addition, operators associated with phase tags ("phase tag operators") manipulate results of phase type operators as appropriate for multiple virtual clocks. The particular terminology used to distinguish these constructs should not be used to limit claim scope. For this illustration, the notation "A" represents a set of signals or waveforms with a clock signal behavior corresponding to a virtual clock A. The notation "A@L" represents a set of signals or waveforms corresponding to a latch clocked by the leading edge of the virtual clock identified as A. Similarly, the notation "B" would represent a set of signals or waveforms with a clock signal behavior corresponding to a virtual clock B.

The circuit design representation 102 includes a clock generator module instance 118, flip-flop module instances 124 and 126, and an inverter 128. A net 134 is graphically depicted as connecting output of the primary input 110 to an FD input of the flip-flop module instance 124. A net 136 is graphically depicted as connecting output of the primary input 112 to an FD input of the flip-flop module instance 126. A net 122 is graphically depicted as connecting output of the clock generator module instance 118 to an FCLK input of the flip-flop module instance 126 and the input of the inverter 128. A net 130 is graphically depicted as connecting output of the inverter 128 to an FCLK input of the flip-flop module instance 124. It is well understood in the field of circuit design that a module instance is the inclusion of a first module within a second module by reference, so that the first module's contents can be reused without duplication.

The phase algebra based evaluation tool (also referred to as the "tool" or the "evaluation tool") determines that inputting the compact multi-waveform representations denoted by the notations "M->A@L:0" 114 and "~G.P" 132 (which corresponds to a compact multi-waveform representation "G.P" 125 after being propagated through the inverter 128) into the flip-flop module instance 124 will yield a compact multi-waveform representation with a notation of "M->G.P@TPGF:0" 142. The phase algebra based evaluation tool also determines that inputting the compact multi-waveform representations denoted by the notations "N->0: P@T" 116 and "G.P" 125 into the flip-flop module instance 126 will yield a compact multi-waveform representation with a phase expression notation of "N->0:G.P@LPGF" 144. The phase algebra based evaluation tool propagates compact multi-waveform representations throughout nets of the circuit design representation 102 using look up tables constructed based, at least in part, on a set of possible waveform states, as described in the U.S. patent application Ser. No. 14/327,658, filed on Jul. 10, 2014, entitled "CIRCUIT DESIGN EVALUATION WITH COMPACT MULTI-WAVEFORM REPRESENTATIONS" and the U.S. patent application Ser. No. 14/547,953, filed on Nov. 19, 2014, entitled "CONDITIONAL PHASE ALGEBRA FOR CLOCK ANALYSIS."

The circuit design representation 102 of FIG. 1 depicts several modules arranged in hierarchical order. A hierarchical module "TOP" 108 includes the flip-flop module instance F1:FLOP 124, the flip-flop module instance F2:FLOP 126, and the clock generator module instance 118. The flip-flop module instances F1:FLOP 124 and F2:FLOP 126 are each separate instances (i.e., instances F1 and F2) of a flip-flop module FLOP, such as of a flip-flop module 602 of FIG. 6. The clock generator module instance G:CLKGEN 118 is an instance (i.e., instance G) of a clock generator module CLKGEN, such as of a clock generator module 604 of FIG. 6. The description below describes various embodiments of how the phase algebra based evaluation efficiently evaluates hierarchical circuit designs that includes the top level module 108 and module instances 118, 124, and 126.

Regarding FIG. 1, the circuit design representation 102 also includes several modes. A mode is a Boolean function of the value of a signal in a circuit, referred to as a mode signal. A mode signal can be used to select between a first signal and a second signal, where the second signal is different from the first signal. The modes of the circuit design representation 102 are depicted using phase expressions, which are a higher level construct from phase tags, i.e., a phase expression includes one or more phase tags (or a higher level construct called MIPES that are based on the phase tags) that are joined by a mode expression. The use and nomenclature of the constructs used to represent compact multi-waveform representations is described below with reference to FIG. 2.

One mode of the circuit design representation 102 is depicted by a phase expression "M->A@L:0" 114. The phase expression "M->A@L:0" 114 indicates that the phase expression 114 can be either an "A@L" or a "0" depending on the value of the Boolean function represented by the mode expression "M". For example, the phase expression "M->A@L:0" 114 indicates that the phase expression 114 can be an "A@L" if the Boolean function represented by the mode expression "M" evaluates to the value true, and can be a "0" if the Boolean function represented by the mode expression "M" evaluates to the value false. Other interpretations are possible.

A mode of the circuit design representation 102 is further depicted by the phase expression "N->0:P@T" 116. The phase expression "N->0:P@T" 116 indicates that the phase expression 116 can be either a "0" or a "P@T" depending on the value of the Boolean function represented by the mode expression "N". For example, the phase expression "N->0: P@T" 116 indicates that the phase expression 116 can be a "0" if the Boolean function represented by the mode expression "N" evaluates to the value true, and can be a "P@T" if the Boolean function represented by the mode expression "N" evaluates to the value false. Other interpretations are possible.

In FIG. 1, module TOP 108 contains three instances of other modules: two instances of module FLOP, named F1 124 and F2 126, and one instance of module CLKGEN named G 118. Each instance is represented by a box in the diagram, also referred as an instance box. The label associated with the box for the flip-flop module instance 126 indicates both the instance name F2 and name of the module being instantiated FLOP. The module FLOP (e.g., module FLOP 602) being instantiated is referred to as the defining module of the flip-flop module instance 126. The module TOP 108 containing the flip-flop module instance 126 is referred to as the instantiating module of the instance.

The term box refers to either an instance box or a primitive component (also called a primitive box). In one embodiment, the points at which boxes connect to signals are called pins. Ports are points at which signals connect to the external interface of a module. Thus, pins of an instance box correspond to ports of its defining module. The instance box for the module F1:FLOP 126 in module TOP 108 includes pins named FD, FCLK, and FQ, which correspond to the ports that have the same name in the defining module FLOP (e.g., FLOP module 602 of FIG. 6). For example, the signal ADIN 134 is connected to input pin FD of the instance box of the flip-flop module instance 124, which corresponds to input port FD of the module FLOP (e.g., module FLOP 602).

The circuit design representation 102 includes hierarchical modules 108, 124, 126, and 118. Typically, each such module has a unique module name, and includes named input and output ports through which it communicates with parts of the design outside the module. Thus, a hierarchical design consists of multiple modules organized into a hierarchy through instantiation, or through including one module within another by reference. Such a reference is called a module instance.

As described above, the phase expressions 114 and 116 specify sets of waveforms. Specifically, the string "G.P" of phase expression 125 specifies that the net will have the waveform of virtual clock P of instance G. The conditional phase expression "M->A@L:0" 114 indicates that when mode M is active, that input receives transitions launched by the leading edge of virtual clock A. Otherwise, the input is held low (constant 0). The phase expression 114 is conditional upon an operating mode of the design. Similarly, the phase expression "N->0:P@T" 116 indicates that when mode N is active, that input is held low. Otherwise, the input BDIN receives transitions launched by the trailing edge of virtual clock P. The virtual clock P of the phase expression "N->0:P@T" 116 (received by the module TOP 108) is not the same virtual clock as the virtual clock P of the phase expression "G.P" 125 generated by module instance G.CLKGEN 118 (referenced by the module CLKGEN), as these virtual clocks have different scope. In a hierarchical design, all names within modules have local scope, meaning that the binding of the name to an object only applies within the module. This applies to instance names, signal names, and to the names of virtual clocks and modes.

In one embodiment, the phase expressions can be propagated through the hierarchical modules of the circuit design representation 102 by flattening the circuit design representation 102. After the circuit design representation 102 that includes hierarchical modules is flattened, the circuit design representation 102 replaces each instance of a module with the contents of its defining module. The flattened circuit design representation of the circuit design representation 102 includes a copy of each primitive box and signal defined within a module for each global instance of that module.

In other embodiments, instead of flattening the circuit design representation 102, propagation of phase expressions through certain modules is reused for multiple instances, resulting in a more efficient and faster propagation of phase expressions through the circuit design representation 102. The embodiments described below specify how two sets of phase expressions (114 and 132 for the first instance 124, and 116 and 125 for the second instance 126) that are propagated to the inputs of the two module instances 124 and 126 of the module FLOP are "mapped down" to a single set of phase expressions at the input ports of a defining module for the module FLOP. The single set of phase expressions is then propagated through the defining module for the module FLOP. A result of a single set of phase expressions is then "mapped up" at the output ports of the defining module for the module FLOP, resulting in two separate phase expressions 142 and 144 that are the outputs of the two module instances 124 and 126. In other words, the phase expressions for both of the instances 124 and 126 of the flip-flop module are propagated through the contents (primitive components) of the flip-flop module only one time, instead of being propagated twice (once per instance) in a flat model of propagation.

The phase algebra based evaluation tool propagates the phase expressions 114, 116, 125, and 132 through the module instances 124 and 126 of the circuit design representation 102 to generate the phase expressions 142 and 144. The manner in which the phase tags and phase expressions are propagated through the circuit design representation 102 is described in more detail below.

When compact multi-waveform representations have been determined, a checking unit 106 of the evaluation tool analyzes the compact multi-waveform representations associated with the nets of the circuit design representation 102. The checking unit 106 can identify defects in the design using these compact multi-waveform representations. For example, the checking unit 106 can evaluate the transition behavior represented by a compact multi-waveform representation associated with a net against a rule or constraint of the net. The rule or constraint of the net can be explicit (e.g., directly defined in associated with the net) or implicit (e.g., indirectly associated with the net via a characteristic of the net or at least one of the sinks of the net). For example, the phase expression outputs generated in FIG. 1 (e.g., outputs 142 and 144) can be provided to the checking algorithms (such as described with reference to patent application Ser. No. 14/547,953) to detect characteristics associated with the design.

Figure 2:
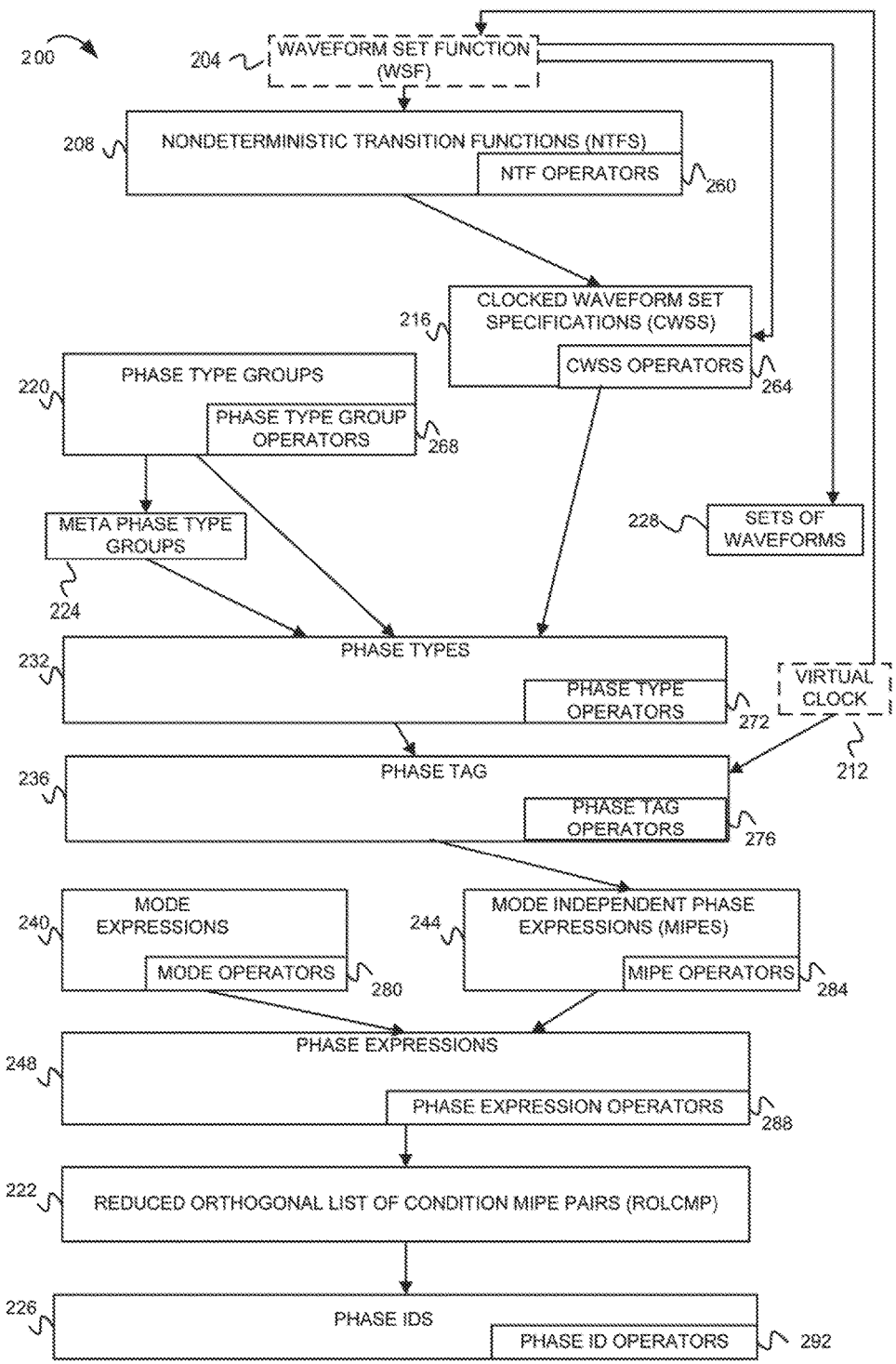
FIG. 2 is a conceptual diagram that depicts an example hierarchy of relationships among data constructs.

A previous state of a signal can be related to multiple possible next states of the signal with a compact representation. Each of these relationships is referred to herein as a nondeterministic transition function ("NTF"). The mapping of time to NTFs can be referred to as a waveform set function (WSF). Each NTF relates a previous state of a waveform or set of waveforms to a set of possible next states. Although separated by a few layers of constructs, the compact multi-waveform representations mentioned earlier are based upon sequences of these NTFs. The NTFs, which can be considered the building blocks, will be first described. Constructs that build upon these NTFs will then be described. FIG. 2 depicts an example hierarchy of data constructs/objects built upon NTFs revealing relationships between the previously mentioned phase tags and NTFs. FIG. 2 will be explored in more detail after describing the data constructs individually. Various example NTFs are described in the U.S. patent application Ser. No. 14/327,658, filed on Jul. 10, 2014.

When propagating compact multi-waveform representations throughout a design, the compact multi-waveform representations are decomposed into the NTFs in order to apply the appropriate NTF operators upon the constituent NTFs. The NTF operators correspond to operations of circuit components (e.g., ntf_and that corresponds to an AND operation of NTFs) and some operations employed for coherency (e.g., ntf_fix_adjacent and ntf_is_subset). The operations can be implemented with look ups, because the look up tables are constructed based on the signal behavior represented by the NTFs and the foundational functions that capture transitional behavior.

Each phase type can be considered a construct (e.g., variable or notation) that represents a set of waveforms as a function of a non-specific virtual clock, as mentioned above. A phase type group represents one or more phase types. For example, the phase type group GCE represents a grouping of two phase types. Phase type groups can be used to differentiate among phase types that have the same Clocked Waveform Set Specification (CWSS).

Phase type operators operate upon the higher level construct of phase types by invoking the operators of lower level constructs. Since phase types correspond to sets of waveforms, the phase type operators represent operations on sets of waveforms. Each phase type is associated with a CWSS and a phase type group. Each CWSS is comprised of NTFs. Each NTF is based upon a WSF, which, in turn, represents a set of multiple waveforms. The phase type group operators can be identified by example function names. The phase type group operators indicate possible output referred to herein as meta phase type groups (meta-PTGs). A meta phase type group is a grouping of phase type groups. Meta phase type groups are implemented to specify results of phase type group operations that conform to the rules specified herein. Phase type groups allow for the compact representations of multiple waveforms because the group identifiers can be used to disambiguate a sequence of nondeterministic signal transition representations that map to multiple phase types.

FIG. 2 is a conceptual diagram that depicts an example hierarchy of relationships among data constructs. Depending on the programming language and particular literature, a data construct can be referred to as a class, an object, a structure, etc. This example data construct 200 includes several elements or members that define the structure of the class and behavior of the class. The structure of this data construct 200 is defined by the following members: NTFs 208, CWSSs 216, phase type groups 220, meta phase type groups 224, phase types 232, phase tags 236, mode expressions 240, mode independent phase expressions (MIPEs) 244, phase expressions 248, reduced orthogonal list of condition-MIPE pairs (ROLCMPs) 222, and phase ids 226. The behavior of the data construct 200 is defined by functions or operators that operate on the depicted members: NTF operators 260, CWSS operators 264, phase type group operators 268, phase type operators 272, phase tag operators 276, mode operators 280, MIPE operators 284, phase expression operators 288, and phase id operators 292.

FIG. 2 depicts a waveform set function (WSF) 204 as supporting the NTF data construct 208. The WSF 204 is depicted with a dashed line because the WSF 204 may not be explicitly defined in a data construct. An NTF data construct can be defined in a class, for example, based on assumptions that rely upon a WSF without explicitly indicating the mappings from each unit of time to an NTF.

A CWSS 216 is a sequence of NTFs 208. Together with a virtual clock 212, a CWSS 216 defines sets of waveforms 228. The virtual clock 212 is also depicted with a dashed line because this may not be explicitly defined in a data construct. The information for a virtual clock (e.g., timing parameters) can be assumed or implied by the CWSS data construct 216. The NTF operators 260 manipulate each NTF 208 that comprises an instance of a CWSS 216, thereby manipulating the CWSS 216 instance.

A user can apply phase tags 236 or phase expressions 248 to the primary inputs and the outputs of clock generators in a circuit design. Operations (i.e., phase tag operators 276 or phase expression operators 288) are performed on these phase tags 236 or phase expressions 248. When the operations are performed, the phase tags 236 or phase expressions 248 are propagated throughout a design, and the resulting phase tags 236 or phase expressions 248 can be analyzed to identify possible design defects or particular design characteristics. A phase tag 236 or phase expression 248 is propagated throughout the circuit design by transforming input phase tags or input phase expressions received at primary inputs and outputs of clock generators in a circuit design through the previously discussed look up tables so that each net of the circuit design is associated with a phase tag 236 or phase expression 248.

A phase type 232 is a generalized version of a phase tag 236. While a phase tag 236 can be associated with a particular virtual clock 212, a phase type 232 is a generalized expression representing a set of waveforms 228 with respect to any virtual clock. As with the other variable types, a phase type 232 can be manipulated through phase type operators 272. A phase type 232 is associated with a clocked waveform set specification (CWSS) 216 and a phase type group 220.

As previously mentioned, multiple phase types 232 can be associated with the same CWSS 216. A phase type group 220 distinguishes such phase types 232, and can distinguish characteristics of signals represented by phase types 232, such as clock signals as compared to data signals. Certain phase type groups 220 can be constituent elements of a meta phase type group 224. Phase type groups 220 and meta phase type groups 224 can be manipulated through phase type group operators 268.

Phase tags 236 and phase expressions 248 themselves are comprised of lower level data constructs (e.g., CWSSs) and also can be converted into different data constructs on which operations are executed. A phase expression 248 is comprised of zero or more mode expressions 240 and one or more MIPEs 244.

A mode expression 240 represents a condition in which a design can operate among multiple modes. A mode is a Boolean function of the value of a signal in the design. A mode can represent a selection between a first signal and a second signal that is different from the first signal. For example, a design might include a dual input multiplexer. A first input to the multiplexer might be a first clock signal and a second input to the multiplexer might be a second clock signal that is asynchronous to the first clock signal. The multiplexer can receive a selector signal that causes it to select between the first signal and the second signal. In the example of FIG. 1, the design includes several modes (e.g., mode M of the phase expression "M->A@L:0" and mode N of the phase expression "N->0:P@T"), each of which can be represented via a mode expression 240. Operations can be performed on the mode expressions 240 through the mode operators 280.

A MIPE 244 is comprised of one or more phase tags 236. A MIPE 244 represents a set of waveforms 228 that is a function of the sets of waveforms 228 represented by the constituent phase tags 236 of the MIPE 244. Operations can be performed on a MIPE 244 through the MIPE operators 284.

A phase expression 248 can be converted into a reduced orthogonal list of condition-MIPE pairs 222, designated as a ROLCMP 222. A ROLCMP 222 is a data construct that enables phase expressions 248 to be converted into phase ids 226. A phase id 226 is a numerical handle associated with a phase expression 248, enabling phase expressions 248 to be more easily manipulated. Subsequent sections of this specification describe converting a phase expression 248 into a ROLCMP 222, and converting a ROLCMP 222 into a phase id 226.

A phase tag 236 represents a set of waveforms 228 via CWSSs. In some cases, a phase tag 236 can be associated with a virtual clock 212. Syntactically, if a phase tag 236 is associated with a virtual clock 212, the phase tag will follow a syntax which includes the name of the virtual clock 212. One such syntax can be represented as "Clock Name@Type of Clock Signal." For example, the phase tag 236 having a value of "A@L" designates the waveform set 228 associated with a latch clocked by the leading phase of virtual clock "A." However, in other cases, a phase tag 236 may not be associated with a virtual clock 212. For instance, the phase tag 236 having a value that includes "*" designates the set of all possible waveforms 228. Phase tags 236 can be manipulated via phase tag operators 276. Phase tag operators 276 implement operations on phase tags 236. A phase tag 236 can be employed to distinguish among a type of signal, such as whether a signal is a clock signal, a data signal (e.g., latch driven signal), or a constant; a type of clock, such as a level, pulse, or delayed clock and inverted versions of each; and a phase of data, such as leading, trailing, or a combination.

As mentioned earlier, a phase type 232 is a generalized expression representing a set of waveforms 228. For example, a phase tag 236 having a value of "A@L" can be generalized to the phase type "C@L," which represents a set of waveforms 228 associated with a leading-phase-clocked latch clocked by any clock C. In some instances, a phase tag 236 conflates with the concept of a phase type 232.

As discussed above, more than one phase type 232 can be represented by identical CWSSs 216. Phase type groups 220 can distinguish phase types 232 that are represented by identical CWSSs 216. Phase type groups 220 can also be implemented to distinguish among classes of signals, such as clock signals, data signals, and combinations of clock and data signals.

Phase expressions 248 can be comprised of mode expressions 240 and MIPES 244. A mode expression 240 is a Boolean function with a mode as its argument. As discussed above, a mode is a Boolean function of the value of a signal in a design. For instance, if a design includes a dual input multiplexer, wherein a first input is a first clock signal and a second input is a second clock signal and a selector signal to the multiplexer causes the multiplexer to select the first or the second clock signal, then a mode expression 240 can represent the conditionality of the multiplexer's output, i.e., that it is either the first clock signal or the second clock signal depending on the selector signal received at the multiplexer. Syntactically, a mode expression 240 can be specified in Backus-Naur form:

```
<mode_expression> ::= <mode_and_expression> | <mode_expression> "|"
<mode_and_expression>
<mode_and_expression> ::= <mode_prefix_expression> |
<mode_and_expression> "&" <mode_prefix_expression>
<mode_prefix_expression> ::= <mode_primary_expression> "~"
<mode_prefix_expression>
<mode_primary_expression> ::= <mode> | "0" | "1" | "("<mode_expression>")".
```

The mode operators 280 comprise the logical functions NOT, AND, OR, and XOR that can take mode expressions 240 as inputs to generate an output mode expression 240 that has been manipulated via operation of one of the logical functions. For example, a logical function AND can be applied to values of two selection signals.

A MIPE 244 is a string that is comprised of a single phase tag 236 or multiple phase tags 236. In particular, a multi-phase tag 236 MIPE 244 is an expression in which two or more phase tags 236 are joined by a transition-union operator, denoted with the "^" symbol. A MIPE 244 represents a set of waveforms 228 that is a function of the set of waveforms 228 represented by the constituent phase tags 236. Specifically, a MIPE 244 represents the set of all waveforms 228 that have transitions only at times coincident with the times of transitions of waveforms in the sets of waveforms 228 represented by the constituent phase tags 236. Syntactically, a MIPE 244 can be expressed in Backus-Naur form:

---
<mode_independent_phase_expression> ::= <phase_tag> |
<mode_independent_phase_expression> "^" <phase_tag>.
---

For example, the MIPE "A@L^B@L" means the set of waveforms that can transition from the leading edge of either clock A or clock B. The MIPE operators 284 allow operations to be performed on MIPES 244.

Phase expressions 248 model the behavior of designs in which at least one circuit component receives a first clock signal and a second clock signal, wherein the first clock signal is asynchronous to the second clock signal. Additionally, phase expressions 248 model the behavior of designs in which at least one circuit component is capable of selecting a first signal or a second signal.

Syntactically, a phase expression 248 can be expressed in Backus-Naur form as follows:

---
<phase_expression>:: = <mode_independent_phase expression>|
<conditional_phase_expression>
<conditional_phase_expression>:: = <mode_expression> "->"
<mode_independent_phase_expression> ":" <phase_expression>.
---

The relationship between a phase expression 248 and the set of waveforms 228 that the phase expression 248 represents is best understood through an example. Consider the example phase expression 248 pe3=m->pe1:pe2, where m is a mode expression 240, pe1 is a MIPE 244, and pe2 is a phase expression 248. The set of waveforms that phase expression pe3 specifies is the set of waveforms w3 such that, for some w1 waveform in pe1 and some w2 waveform in pe2, w3(t)=w1(t) if m is true at time t; otherwise, w3(t)=w2(t). Two phase expressions 248 are equal if the waveform set 228 that each phase expression 248 specifies is the same. In some instances, a phase expression 248 might be optimally expressed in reduced orthogonal form. For example, the phase expression 248 pe=m_1->p_1: m2->p_2: . . . :p_k is in a reduced orthogonal form if four conditions are met: the m_i mode expressions 240 are pairwise orthogonal, meaning that m_i & m_j=0 whenever i does not equal j; none of the m_i mode expressions 240 are constant false Boolean functions, meaning that there does not exist an m_i that equals 0; the mode expression 240 defined by m_k=~m_1 & ~m_2 & . . . & ~m_{k−1} is not the constant false Boolean function, meaning that m_k does not equal 0; and the p_i MIPEs 244 are different from each other.

The phase expression operators 288 implement mathematical operations (i.e. logical operations) on phase expressions 248. For example, the phase expression operators 288 can be used to find the logical AND of a first phase expression 248 and a second phase expression 248. In general, phase expression operators 288 perform operations on phase expressions 248.

The following flowcharts provide example operation of a phase algebra based design tool that operates with compact multi-waveform representations. These example operations will refer back to the operators and data constructs described herein, and also as described in the tables in the U.S. patent application Ser. No. 14/327,658.

Figure 3:
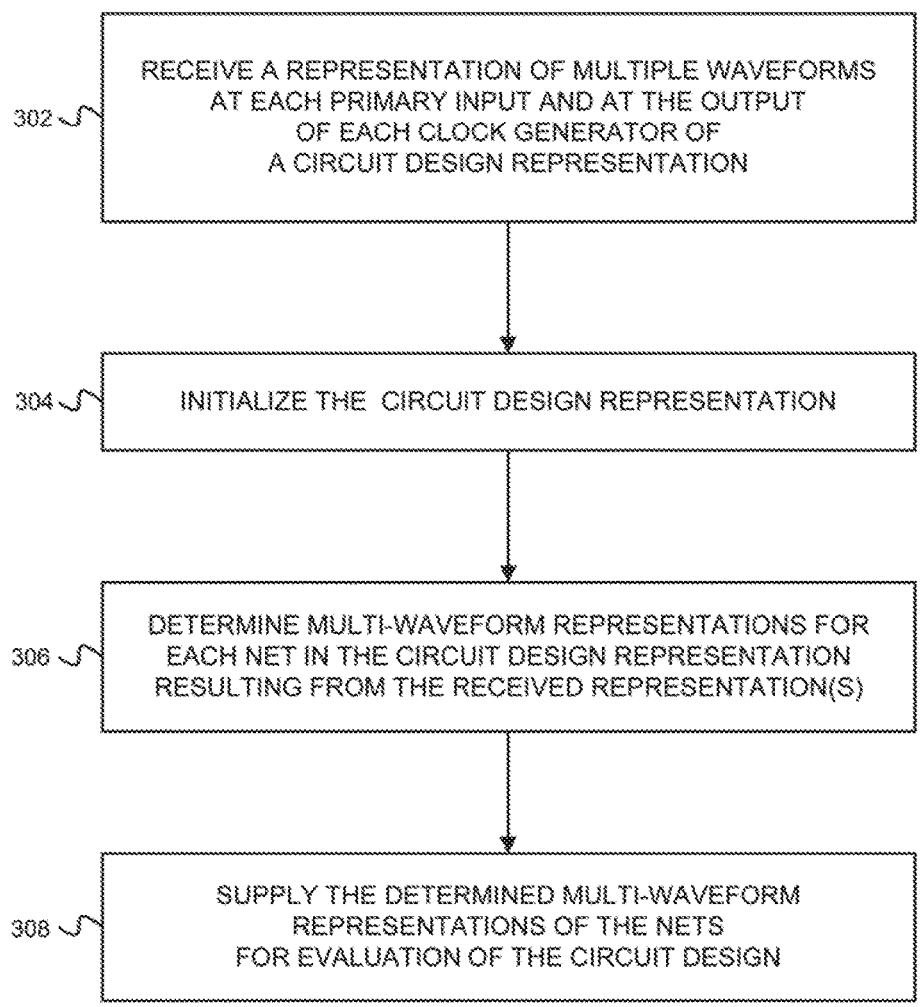
FIG. 3 is a flowchart of example operations for initializing an RTL circuit design representation of phase algebra based evaluation and propagation of compact multi-waveform representations throughout the design representation.

FIG. 3 is a flowchart of example operations for initializing a circuit design representation of phase algebra based evaluation and propagation of compact multi-waveform representations throughout the design representation. At block 302, a representation of multiple waveforms is received at each primary input and at the output of each clock generator of a circuit design representation. For instance, a phase tag or phase expression is associated with a primary input of a circuit design representation. At block 304, the circuit design representation is initialized to prepare the circuit design representation to accept propagated multi-waveform representations. The initialization marks nets for propagation operations. At block 306, the multi-waveform representations are determined for each of the nets in the RTL circuit design resulting from the received multi-waveform representation. For example, operators are applied to determine output phase tags based on the various circuit components modeled in the circuit design representation. At block 308, the determined multi-waveform representations are supplied for evaluation of the RTL circuit design.

As discussed earlier, higher level data constructs (e.g., phase tags) are decomposed into lower level data constructs (e.g., NTFs) in order to apply operations of circuit components modeled in the circuit design representation. These operations often yield a sequence of NTFs or a CWSS that is converted back into a phase type in order for propagation to continue or determine an output to associate with a net for later defect analysis. An output phase type can be determined based on a received input CWSS and a received input phase tag group or meta phase tag group.

Figure 4:
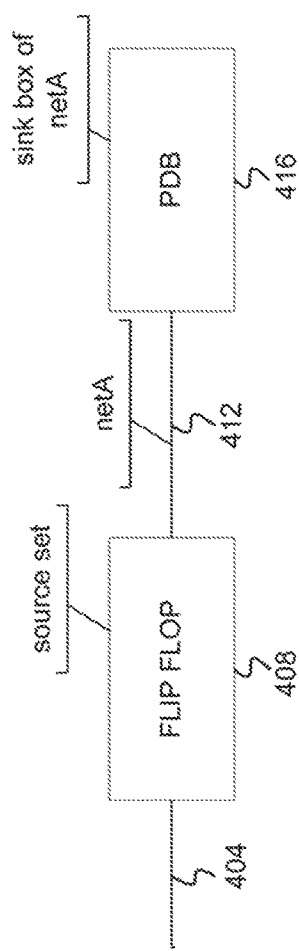
FIG. 4 illustrates terminology associated with the example propagation algorithm and pseudocode to be described.

FIG. 4 illustrates terminology associated with the example propagation algorithm and pseudocode to be described. A flip-flop 408 and path delay block (PDB) 416 are referred to as boxes. The connectors 404, 412 represent nets. The boxes 408, 416 can also be referred to as nodes. The connector 404 is the input net to a flip-flop 408, and the connector 412 ("netA") is both the output net from the flip-flop 408 and the input net to the PDB 416. The propagation algorithm determines an output phase id, which will appear at netA 412. PDB 416 can be referred to as the sink box of netA 412. In one embodiment, a source set and an update set can be established. The source set and update set can be data structures that store information about the status of each box in a circuit design representation. For example, the source set might include boxes that are to be processed by the current iteration of the propagation algorithm. The update set can include boxes that are to be processed by the next iteration of the propagation algorithm. Various embodiments of the propagation algorithm are described below with reference to FIGS. 10-12 and the pseudocode.

Figure 5:
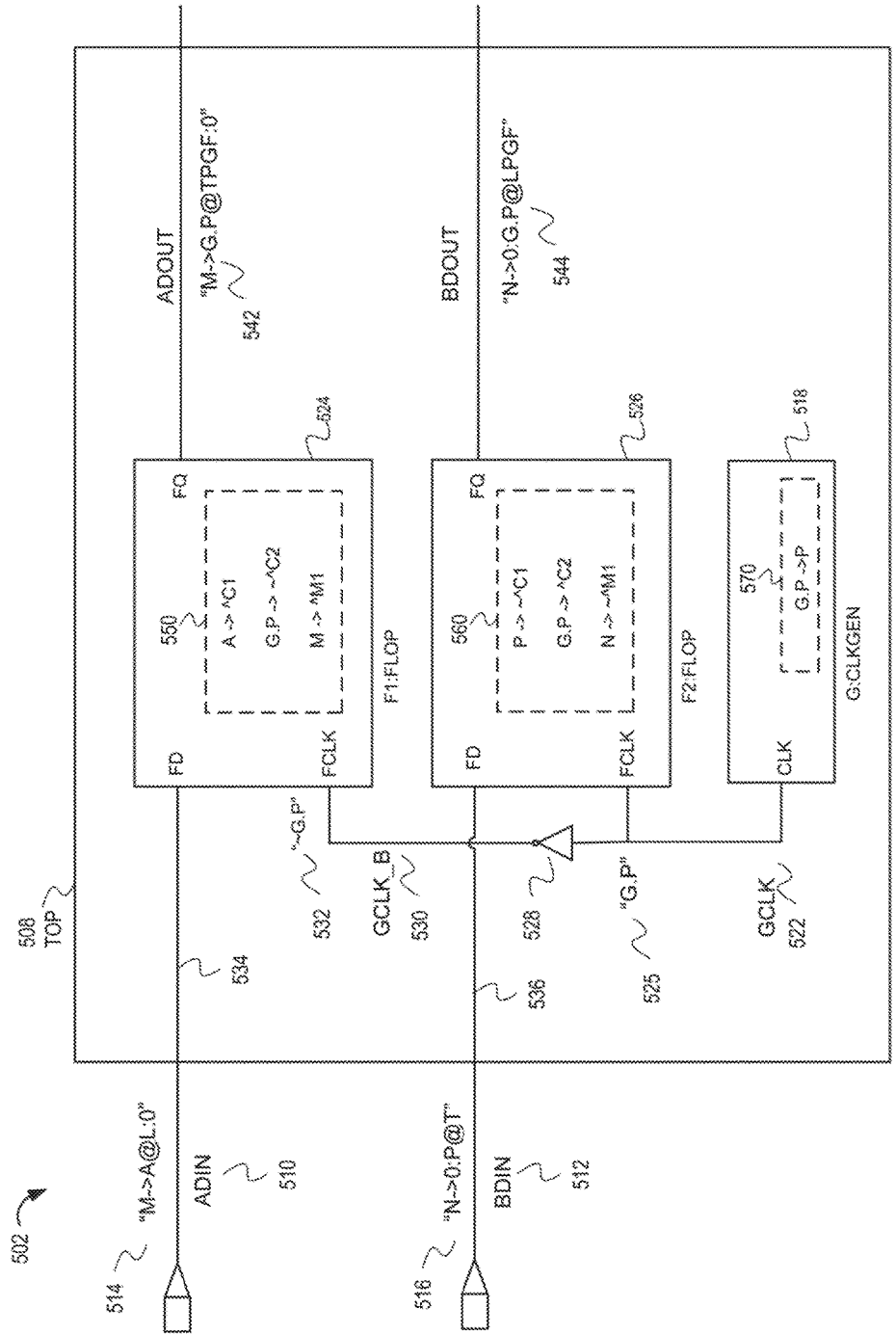
FIG. 5 is a conceptual diagram that depicts example phase algebra based circuit design evaluation with a compact multi-waveform representation, including mappings of hierarchical modules with a common usage.

FIG. 5 illustrates one embodiment of propagating a single set of phase expressions through a single instance of a flip-flop module. A circuit design representation 502 of FIG. 5 is similar to the circuit design representation 102 of FIG. 1, except that mappings for each of the flip-flop module instances 524 and 526 are shown. Thus, the circuit design representation 502 includes a clock generator module instance 518, flip-flop module instances 524 and 526, and an inverter 528. A net 534 is graphically depicted as connecting output of the primary input 510 (ADIN) to an FD input of the flip-flop module instance 524. A net 536 is graphically depicted as connecting output of the primary input 512 (BDIN) to an FD input of the flip-flop module instance 526. A net 522 is graphically depicted as connecting output of the clock generator module instance 518 to an FCLK input of the flip-flop module instance 526 and the input of the inverter 528. A net 530 is graphically depicted as connecting output of the inverter 528 to an FCLK input of the flip-flop module instance 524.

As virtual clocks and modes are local in a hierarchical design, the evaluation tool generates new virtual clocks and/or new modes for modules that do not have defined virtual clocks and/or modes. The phase algebra based evaluation tool thus can generate the new virtual clock/mode (referred to as deriving a virtual clock/mode) for a module. The phase algebra based evaluation tool can also generate a new phase expression for the module that refers to the derived virtual clock or mode. This process occurs at module boundaries, i.e., either at the input port of a module, or at the output pin of an instance box. Module instances 124, 126, and 118 do not have defined virtual clocks/modes, as they are instantiated from the defining modules FLOP and CLK-GEN.

Figure 6:
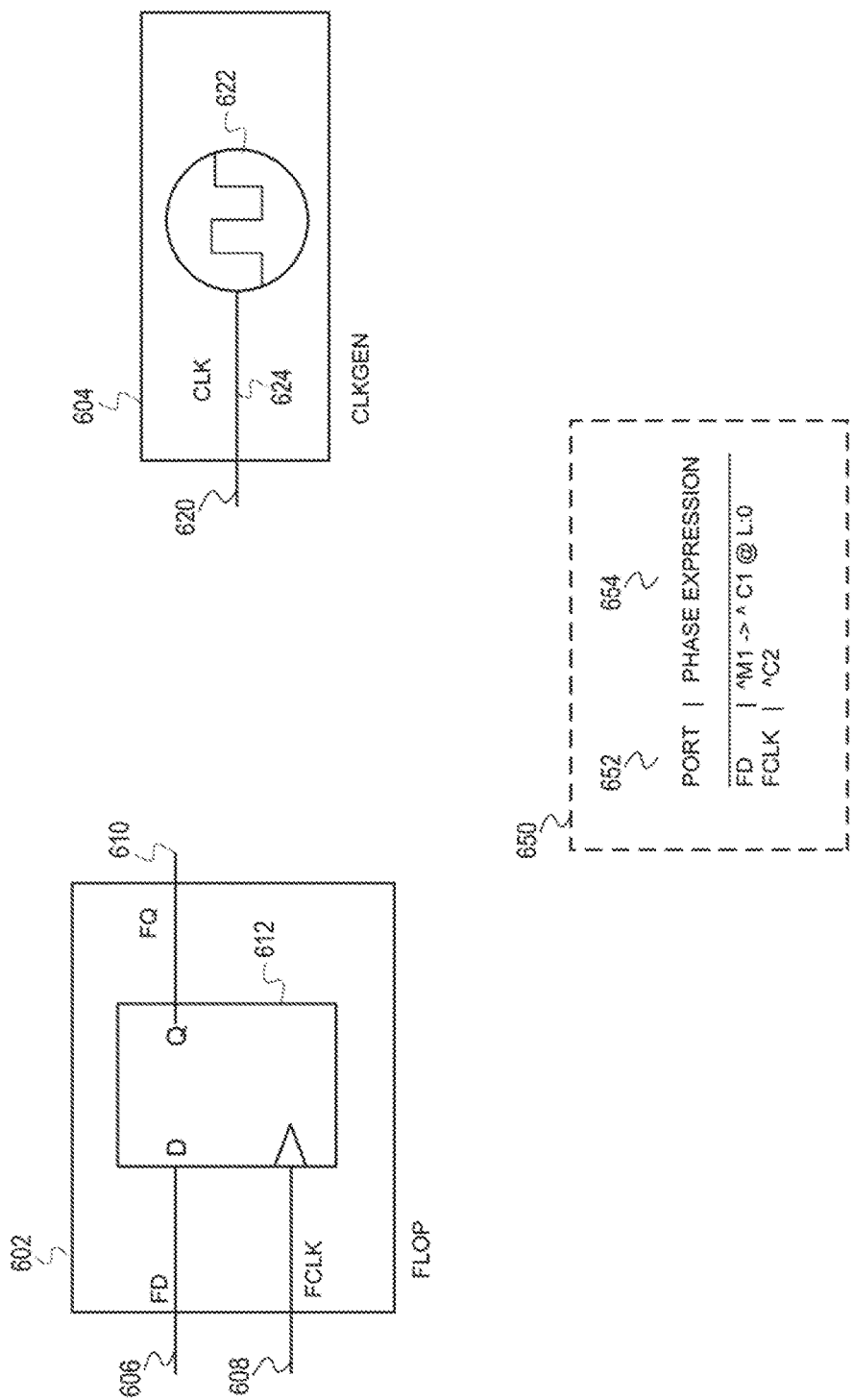
FIG. 6 is a conceptual diagram that depicts hierarchical modules that are instantiated in the evaluation of the example circuit design of FIG. 5.

The defining modules are shown in FIG. 6 as module FLOP 602 and module CLKGEN 604. Thus, with reference to FIG. 6, the tool can derive virtual clocks ^C1 and ^C2 and one derived mode ^M1 for the module FLOP 602 (where the "^" notation indicates a derived clock or mode that is local for a given module). The defining module CLKGEN 604 already includes a designer-specified "P" virtual clock. The tool does not derive a virtual clock for the module CLKGEN 604. During propagation of phase expressions through the defining module 602, the phase expressions (as received on FD 606 and FCLK 608 input ports) are propagated through a flip-flop component 612 to generate a phase expression on an output port FQ 610. A clock generator component 622 generates a clock signal that is propagated as a CLK 624 through output port 620, such as described in U.S. patent application Ser. No. 14/327,658.

Once the two virtual clocks (^C1 and ^C2) and the mode (^M1) are derived, the tool can generate a mapping for each of the hierarchical module instances 524, 526, and 518. Thus, the tool generates a mapping 550 for the flip-flop module instance 524, a mapping 560 for the flip-flop module instance 526, and a mapping 570 for the clock generator module instance 518. Each of the mappings 550, 560, and 570 is a one-to-one function associated with an instance box that maps the virtual clocks and modes in the instantiating module of the instance box to the virtual clocks and modes in the defining module of the instance box, or inversions thereof.

The tool also can generate mappings for any first instances of modules where a given circuit design representation includes multiple instances of the same module. Thus, the tool can first generate the mapping 570 for the first and single instance 518 of the CLKGEN module and the mapping 550 for a first instance 524 of the multiple-instance FLOP modules 524 and 526. The tool then generates the mapping 560 for the second instance 526 of the multiple-instance FLOP modules 524 and 526 such that the mapping 560 is compatible with the mapping 550. Two mappings for two instances of the same module are compatible with each other if the phase expression(s) associated with both of the two instances of this module can be propagated once through the defining module and generate an output phase expression that can then be mapped up to two separate phase expressions. Two mappings for two instances of the same module are compatible with each other if an input sequence of signal transition representations received by the first instance can be mapped, using a first mapping, to the same common sequence of signal transition representations as a mapping of another input sequence of signal transition representations received by the second instance using a second mapping.

Given a virtual clock and mode map at an instance box, the tool can transform a phase expression in the instantiating module into a phase expression in the defining module, or vice versa. The tool can map the phase expression by the following procedure:

1. For each clock-dependent phase tag in a phase expression, the tool replaces a virtual clock of that phase tag by the virtual clock to or from which it is mapped. If the mapping is through an inversion, then the tool can apply a phase inversion function to the phase tag. The phase inversion function replaces an input phase tag with the phase tag that would be produced by inverting the virtual clock referenced by the input phase tag. For example, applying the phase inversion function to the phase tag "P" would produce the phase tag "~P", and applying the phase inversion function to the phase tag "P@L" would produce the phase tag "P@T".

2. For each conditional phase expression (i.e., that contains a mode expression), the tool replaces each mode by the mode to or from which it is mapped. If the mapping was through an inversion, then the tool can swap the if-true and if-false branches of the conditional phase expression.

3. The tool can perform the mapping as long as a phase expression does not reference virtual clocks or modes that are not in the map.

The process of mapping a phase expression from the instantiating module to the defining module is referred to as mapping down the phase expression. The process of mapping a phase expression from the defining module to the instantiating module is referred to as mapping up the phase expression. A phase expression in an instantiating module is consistent with a phase expression in a defining module, or vice versa, if one is equivalent to a mapping of the other.

The mapping 550 includes a mapping of "A->^C1", "G.P->~^C2", and "M->^M1". The mapping 550 can be used to map down the instantiating module phase expressions "M->A@L:0" and "~G.P". The mapping 550 maps the instantiating module phase expressions to the defining module phase expressions "^M1->C1@L:0" and "^C2", respectively. Similarly, the mapping 560 includes a mapping of "P->~^C1", "G.P->^C2", and "N->~^M1". The mapping 560 can be used to map down the instantiating module phase expressions of "N->0:P@T" and "G.P". The mapping 560 maps the instantiating module phase expressions to the defining module phase expressions "^M1->C1@L:0" and to "^C2" (which are referred to as a common sequence of signal transition representations), respectively. In this example, the mappings 550 and 560 both can be used to map up the same defining module phase expression (i.e., the same common sequence). In other words, the instances 524 and 526 have the same input phase expression signature, where the input phase expression signature is the common sequence of signal transition representations. The input phase expression signature can be represented as a table, as shown by element 650 (of FIG. 6), where column 652 includes the ports of the defining module 602, and column 654 maps each of the phase expressions "^M1->C1@L:0" and "^C2" to each port of the defining module 602.

Once the mappings 550, 560, and 570 are generated, and the tool determines that the phase expression only needs to be propagated through one instance of FLOP, the phase expressions are then propagated through module FLOP. Specifically, the phase expression at the output of the flip-flop in FLOP is equal to the result of propagating the phase expressions at its inputs, "^M1->C1@L:0" and "^C2", using the phase expression operator 288 corresponding to a flip-flop. The resulting phase expression at the output of the flip-flop in FLOP is "^M1->^C2@LPGF:0". The phase expressions at the inputs of module FLOP are consistent with the phase expressions that were propagated to the corresponding input pins of instances of FLOP. The phase expressions at the instance output pins (i.e., ADOUT and BDOUT) are also consistent with the phase expression at output port FQ of module FLOP. Likewise, the phase expression at the output port of module CLKGEN is consistent with the phase expression on the output pin of the instance of CLKGEN.

The phase algebra based evaluation tool determines that inputting the compact multi-waveform representations (e.g., phase expressions) denoted by the notations "M->A@L:0" 514 and "~G.P" 532 (which corresponds to a compact multi-waveform representation "G.P" 525 after being propagated through the inverter 528) into the flip-flop module instance 524 will yield a compact multi-waveform representation with a notation of "M->G.P@TPGF:0" 542, which is the result of mapping up the phase expression "^M1->^C2@LPGF:0" using the mapping 550. The phase algebra based evaluation tool also determines that inputting the compact multi-waveform representations denoted by the notations "N->0:P@T" 516 and "G.P" 525 into the flip-flop module instance 526 will yield a compact multi-waveform representation with a notation of "N->0:G.P@LPGF" 544, which is the result of mapping up the phase expression "^M1->^C2@LPGF:0" using the mapping 560.

The propagation of the common sequence through the defining module is more efficient than propagating phase expressions through a flat model. The phase expression at the output of the flip-flop (i.e., of the defining module FLOP 602) is determined only once, instead of being determined twice (once per each instance 524 and 526 of FLOP) as would be done on the flat model. However, in some situations, multiple instances of the same defining module cannot be mapped to the same module. In other words, there is not a single common sequence that is common between the multiple instances of the module, so a single phase expression cannot be propagated through the defining module to generate a resultant output phase expressions that can then be mapped up to generate phase expressions for the multiple instances of the module. In these situations, the tool instead generates several module usages, as described below.

Figure 7:
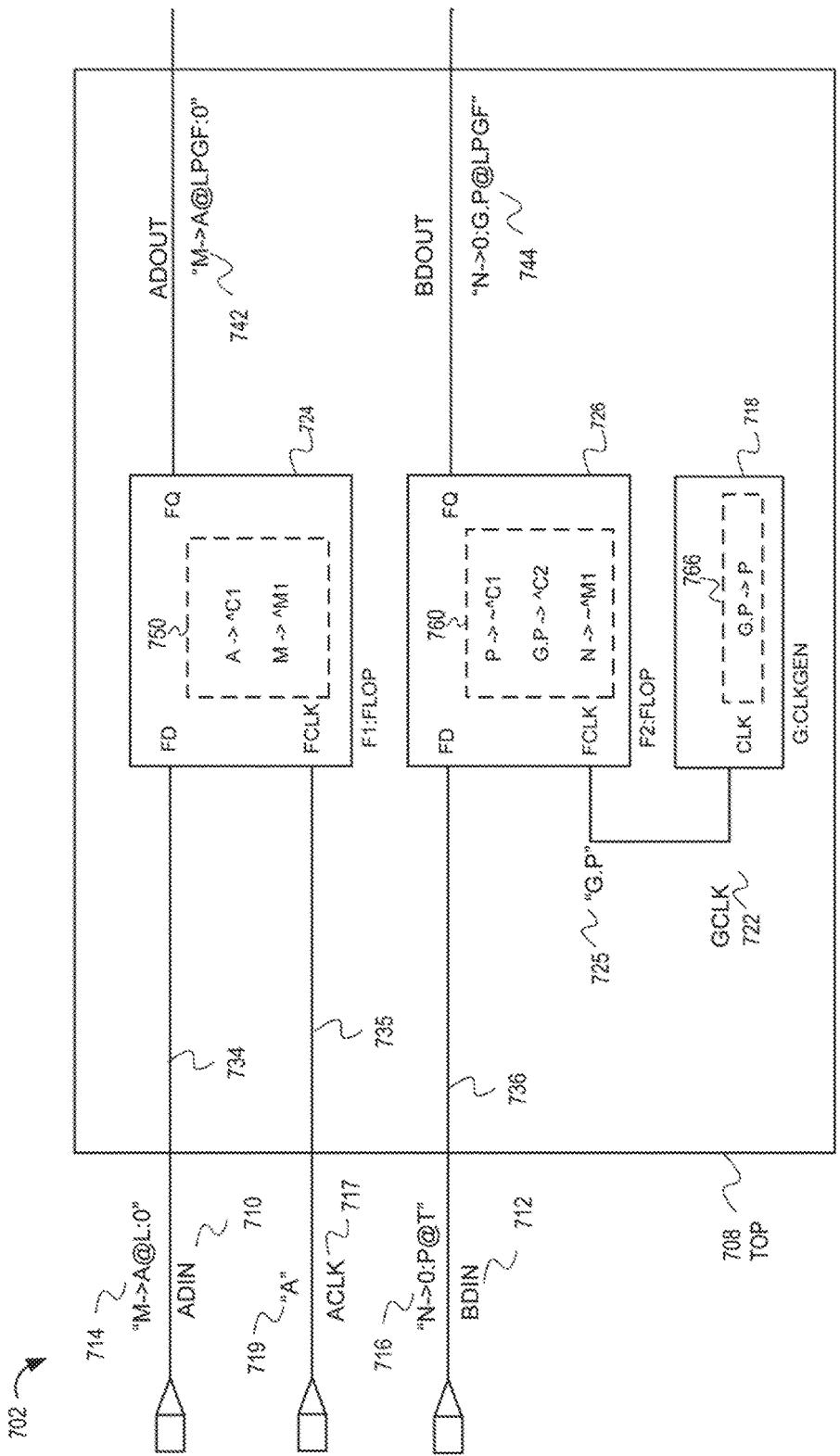
FIG. 7 is a conceptual diagram that depicts example phase algebra based circuit design evaluation with a compact multi-waveform representation, including mappings of hierarchical modules without a common usage.

FIG. 7 illustrates one embodiment of propagating multiple sets of phase expressions through multiple usages of a flip-flop module. A circuit design representation 702 of FIG. 7 is similar to the circuit design representation 502 of FIG. 5, except that the FCLK inputs of the instances of flip-flop modules 724 and 726 receive clock inputs that are unrelated to each other. Thus, the circuit design representation 702 includes a clock generator module instance 718 and flip-flop module instances 724 and 726. A net 734 is graphically depicted as connecting output of a primary input 710 (ADIN) to an FD input of the flip-flop module instance 724. A net 735 is graphically depicted as connecting output of a primary input 717 (ACLK) to an FCLK input of the flip-flop module instance 724. A net 736 is graphically depicted as connecting output of the primary input 712 (BDIN) to an FD input of the flip-flop module instance 726. A net 722 is graphically depicted as connecting output of the clock generator module instance 718 to an FCLK input of the flip-flop module instance 726.

The tool determines that the input phase expression signatures of the two module instances 724 and 726 are not compatible with each other. An input phase expression signature of a module is the phase expression associated with each input port of a module; i.e., it is a mapping from an input port to the phase expression. The input phase expression signature references a virtual clock and mode set. In one embodiment, the input phase expression signature of a module, and the virtual clock and mode map at an instance of that module are consistent with each other if the phase expressions at the instance input pins can be mapped to the phase expressions in the signature. For example, with reference to FIG. 6, the input phase expression signature 650 of the defining module FLOP (i.e., the defining module for the two instances of FLOP F1 724 and F2 726) consists of phase expression "^M1->^C1@L:0" at input FD and phase expression "^C2" at input FCLK. The virtual clock and mode set of the module FLOP 602 is {^C1, ^C2, ^M1}.

The input phase expression signature 650 of FLOP 602 is consistent with the instance F2:FLOP 726 because these phase expressions are consistent with "N->0:P@T" and "G.P", respectively, given the virtual clock and mode map 760 (i.e., the mapping 760) at instance F2. However, the signature is not consistent with the instance F1:FLOP 724, because phase expression "^C2" at input of FCLK of FLOP 802 is not consistent with the phase expression "A" at the corresponding input pin of the instance F1:FLOP 724, as virtual clock A is mapped to virtual clock ^C1, not ^C2. Further, the virtual clock A cannot be mapped to ^C2, as this would violate the one-to-one mapping rule. As there is no virtual clock and mode map that would work at instance F1, the input phase expression signature of the defining module FLOP 802 is incompatible with the instance F1:FLOP 724.

Thus, the tool generates two module usages to have modules with two different input phase expression signatures for the module FLOP. A usage is a version of a module that can have a different set of virtual clocks, modes, and phase expressions relative to other usages of the same module. With reference to FIG. 7, each of the instances F1:FLOP 724 and F2:FLOP 726 is assigned a specific usage of the module. This assignment can change during the course of phase expression propagation. An input phase expression signature is then specific to a usage and it indicates a mapping from input ports of the module used by the usage to phase expressions. The virtual clocks and modes are local to a usage instead of a module. As a result, one usage of a given module may have different virtual clocks and modes than another usage of the same module, except that defined virtual clocks and modes are common to all usages of a module.

Figure 8:
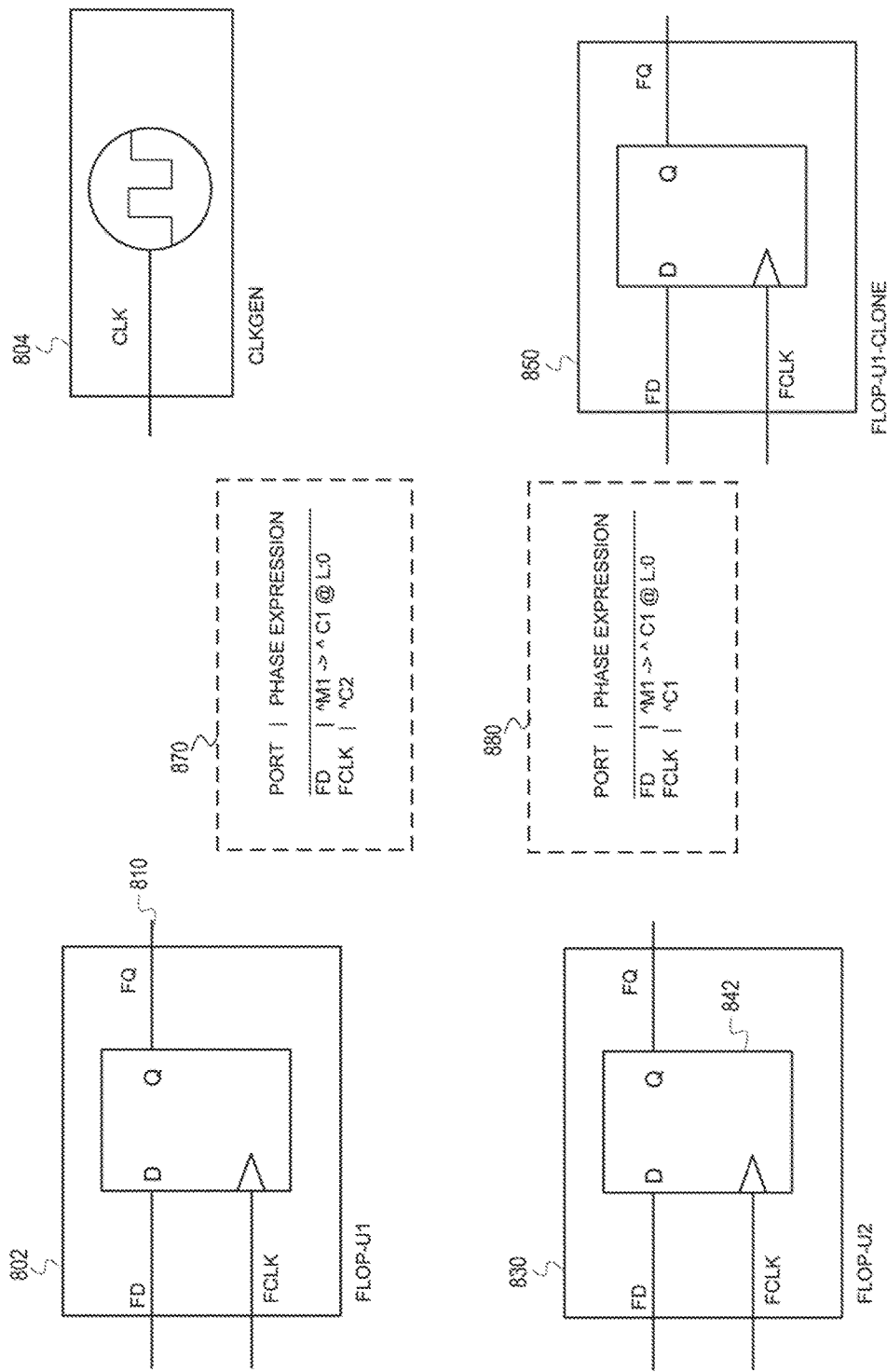
FIG. 8 is a conceptual diagram that depicts hierarchical modules that are instantiated in the evaluation of the example circuit design of FIG. 7.

With reference to FIG. 8, the tool generates two usages of the module FLOP, usages FLOP-U1 802 and FLOP-U2 830. The input phase expression signature 880 of usage FLOP-U1 802 is now consistent with instance F1:FLOP 724. The usage FLOP-U2 830 has the same input phase expression signature 870 as shown earlier for module FLOP, which is consistent with the instance F2:FLOP 726. FIG. 7 illustrates the results of separately propagating phase expressions through the two usages, and mapping their output phase expressions up to the corresponding box outputs in module TOP 708. The phase algebra based evaluation tool determines that inputting the compact multi-waveform representations denoted by the notations "M->A@L:0" 714 and "A" 719 into the flip-flop module instance 724 will yield a compact multi-waveform representation with a notation of "M->A@LPGF:0" 742. The phase algebra based evaluation tool also determines that inputting the compact multi-waveform representations denoted by the notations "N->0:P@T" 716 and "G.P" 725 into the flip-flop module instance 726 will yield a compact multi-waveform representation with a notation of "N->0:G.P@LPGF" 744. The tool also generates a mapping 766 for the clock generator module instance 718.

A usage of a module is compatible with an instance of that module if the input phase expression signature of the usage is compatible with the instance. A consistent virtual clock and mode map makes the input phase expression signature consistent with the instance. If the tool can successfully find such a map, then the tool can reuse the results of propagating phase expressions through the usage for the given instance box. One method to determine if a usage is compatible with an instance is to iterate over all possible virtual clock and mode maps, and for each, map the phase expressions at the instance input pins down to the usage, and see if they match the usage's input phase expression signature.

The tool can eliminate some usages prior to testing all of the possible maps. In some embodiments, if the number of distinct virtual clocks referenced by a usage's input phase expression signature does not match the number of distinct virtual clocks referenced by the phase expressions at the instance box input pins, that usage can be rejected as a possible candidate. A similar check can be performed for modes.

In some embodiments, the tool can compare the forms of the phase expressions at the instance box with the forms of the phase expressions in the usage's input phase expression signature. To do this, the tool defines a MIPE signature of a phase expression as a sequence of non-negative integers, where the ith integer in the sequence is the number of MIPEs found in an ROLCMP form of the phase expression that have exactly i number of phase tags. For example, the phase expression "TST->0:B@T" has an ROLCMP form ((TST, 0), (~TST, B@T)), which contains two MIPEs, "0" and "B@T", each of which contains a single phase tag. It therefore has a signature of (2), the sequence consisting only of the integer 2, because it has 2 MIPEs having one phase tag. Phase expression "TST->0:A@L^B@L", by contrast, has ROLCMP form of ((TST, 0), (~TST, A@LAB@L)). This phase expression thus has a MIPE signature of (1, 1), because it has one MIPE with the single phase tag "0" and one MIPE with two phase tags, "A@L" and "B@L". The phase expression "~A" has a MIPE signature of (1). The tool determines whether the MIPE signature of each phase expression at the instance box inputs matches the MIPE signature of the corresponding phase expression in the usage's input phase expression signature. If any do not, the usage can be rejected as a candidate.

In one embodiment, the tool generates a graph that maps virtual clocks to reject certain candidates. The tool defines a normal clock signature of a phase expression with respect to a given virtual clock, as a set of phase types of phase tags in the phase expression that are dependent upon the given virtual clock. The tool determines an inverse clock signature of a phase expression with respect to a given virtual clock, as a set of phase types of the phase tags that would be produced by applying the phase inversion function. The tool then can construct a bipartite graph (referred to as a virtual clock graph), consisting of two sets of vertices, called set I and set U. Set I contains one vertex for each virtual clock referenced by the phase expressions on the inputs of the instance box. Set U contains one vertex for each virtual clock referenced by the usage's input phase expression signature. The tool can create an edge from a vertex in set I to a vertex in set U, if either the normal clock signature for the virtual clock associated with the vertex in set I or the inverse clock signature for the virtual clock associated with the vertex in set I is equivalent to the normal clock signature for the virtual clock associated with the vertex in set U. If the former condition is true, the edge is labeled for a normal clock signature. If the latter condition is true, the edge is labeled for an inverse clock signature. It is possible for both conditions to be true.

Once the graph is complete, the tool can search for a perfect matching, which means a set of edges such that (1) no two edges have a common vertex, and (2) every vertex is connected to an edge. There are known algorithms for finding perfect matchings. Each edge in the perfect matching defines one or two possible virtual clock mappings. If the edge is labeled for a normal clock signature, then the virtual clock in set I can be mapped to the virtual clock in set U, with no inversion. If the edge is labeled for an inverse clock signature, then the virtual clock in set I can be mapped to the inverse of the virtual clock in set U. If there is no perfect matching, the usage can be rejected as a candidate. Additional embodiments that limit the number of usage candidates are also contemplated.

Figure 9:
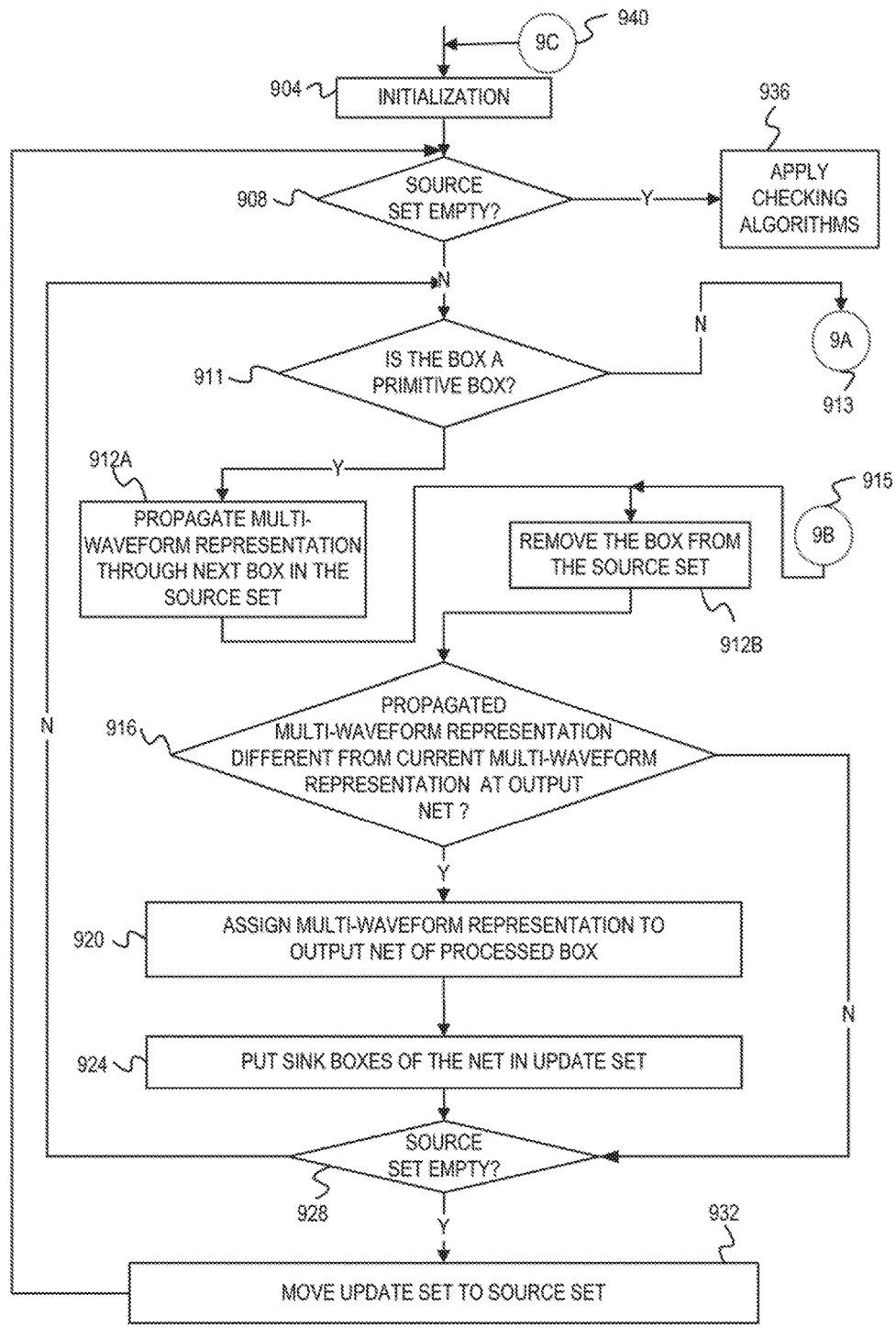
FIG. 9 is a flowchart of example operations for initializing an RTL circuit design representation of phase algebra based evaluation and propagation of compact multi-waveform representations throughout the design representation.

FIG. 9 is a flowchart of example operations for propagating multi-waveform representations after initialization of a circuit design representation. At block 904, the circuit design representation is initialized, such as discussed above. The flowchart of FIG. 9 can be applied to a top level of a hierarchical design of a circuit design representation (e.g., FIG. 1 TOP module 108, FIG. 5 TOP module 508, and/or FIG. 7 TOP module 708). The flowchart of FIG. 9 can be performed in a recursive fashion, as illustrated by block 9A (corresponding to the flowchart of FIG. 10) being performed if the box being accessed is not a primitive. A primitive is an element that does not contain any other modules, i.e., that is not a hierarchical module or module instance. When the flowchart of FIG. 9 is performed recursively, it can be performed via the flow proceeding to block 9C 940 from blocks 1114 (FIG. 11), 1208 (FIG. 12), and/or 1216.

For example, the tool can start with the TOP module 508, and then processes each module instantiated in the TOP module 508, one at a time, as the tool processes each module instance. The processing of a module is done with respect to a particular instance encountered during the processing of the higher-level module, essentially using a depth-first traversal of a graph. Thus, FIG. 9 can be called recursively for each module usage in the hierarchical module TOP 508. In one embodiment, with reference to pseudocode discussed below, the flowchart of FIG. 9 corresponds to propagate_through_usage function.

At block 908, a source set is checked to determine whether it is empty. If the source set is empty, then the propagation process is complete and the flow proceeds to block 936. At block 936, checking is applied to the resulting multi-waveform representation propagated throughout the design. The checking algorithms use the generated phase ids to identify particular characteristics associated with a design, some of which can be potential defects. If the source set was not empty at block 908, the flow proceeds to block 911.

At block 911, the tool determines whether the next box in the source set is a primitive box. If the box is a primitive box, the flow proceeds to block 912A. If the box is not a primitive box (i.e., the box is an instance box that corresponds to a module instance), the flow proceeds to block 913 (i.e., element 9A via which the flow proceeds to the flowchart of FIG. 10).

At block 912A, an input multi-waveform representation is propagated through the next box in a source set and the processed box is removed from the source set. The flow proceeds to block 912A from block 911. In one embodiment, block 912A can be called (e.g., called in a manner similar to that of a function or a subroutine) from block 911. At block 912A, the input multi-waveform representation is propagated through the box by applying operators such as those of FIG. 2. For example, an input phase id is used to search for a result phase id in a lookup table. If a result phase id is found in the lookup table, then the result phase id is returned, and the process proceeds to block 912B. The particular look up tables accessed will vary dependent upon the phase id and the operation (e.g., AND, OR, etc.) represented by the box. However, if a result phase id is not found in the lookup table, then the input phase id is converted to a ROLCMP in accordance with the phase id look-up algorithm. Operations then can be performed on the ROLCMPs. Phase expressions can be derived from the ROLCMP operations. The phase expressions can be converted into phase ids. At block 912B, the processed box is removed from the source set. The flow can proceed to block 912B from block 912A or from block 915 (i.e., element 9B). The process proceeds to block 916.

At block 916, the multi-waveform representation resulting from block 912 is compared to the multi-waveform representation currently associated with the output net of the processed box. If the resulting multi-waveform representation is different from the current multi-waveform representation, the flow proceeds to block 920. Otherwise, the process proceeds to block 928.

At block 920, the multi-waveform representation resulting from block 912 is assigned to the output net associated with the processed box. At block 924, the sink boxes of the net are placed in the update set.

At block 928, the source set is checked to determine whether it is empty. If the source set is not empty, then the flow again proceeds to block 911 at which the next box in the source set is processed. Otherwise, the flow proceeds to block 932. At block 932, the source set is overwritten with the contents of the update set. The flow proceeds to block 908.

Figure 10:
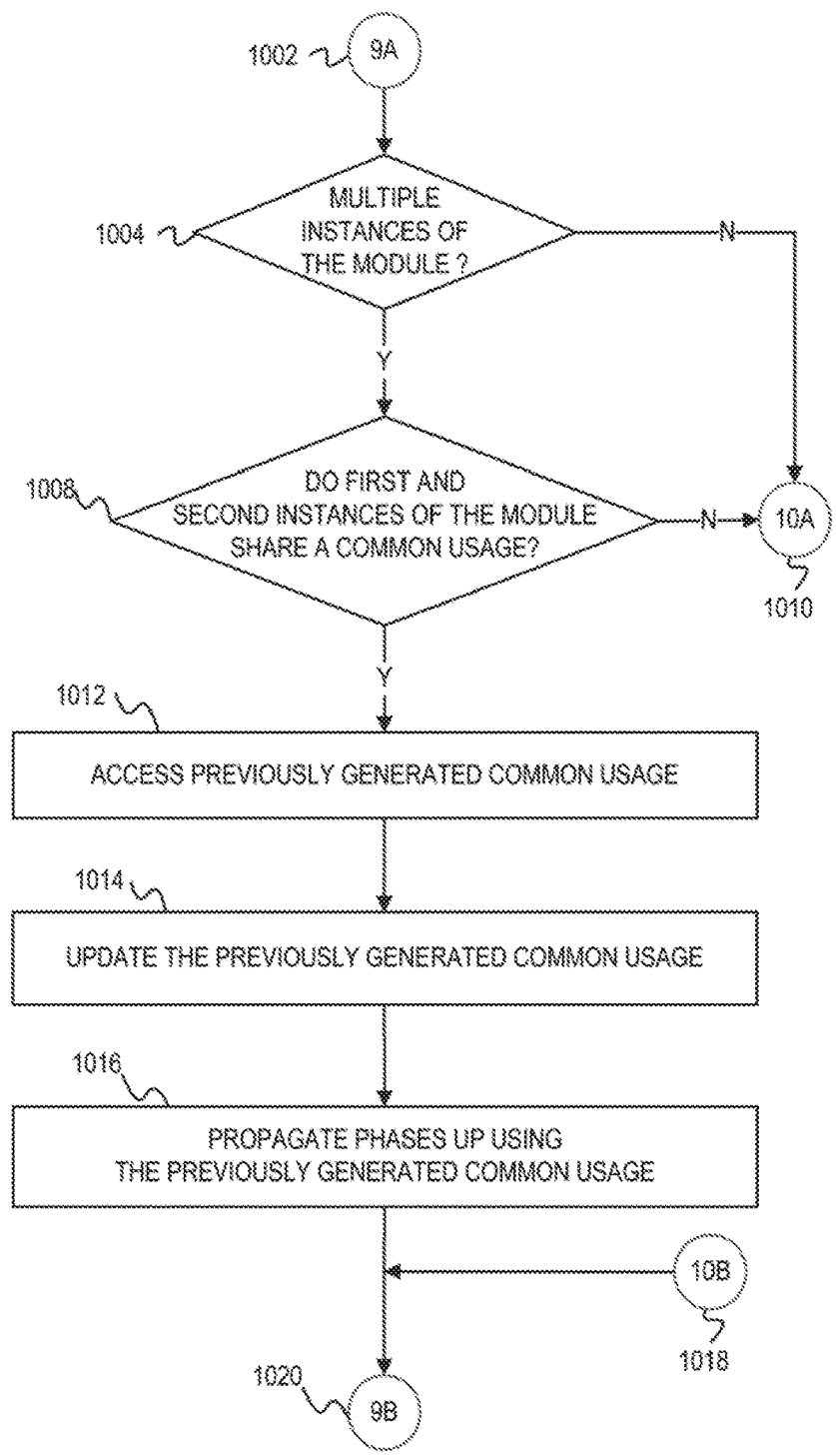
FIGS. 10-12 are flowcharts of example operations for propagating multi-waveform representations through hierarchical modules of an RTL circuit design representation.

FIG. 10 is a flowchart of example operations for propagating multi-waveform representations (e.g., phase expressions) through hierarchical modules, or module usages.

At block 1002, the flowchart of FIG. 10 is accessed from block 9A of FIG. 9. With reference to FIG. 5, the tool can access module instance F1:FLOP 524, as the first box being processed by the flowchart of FIG. 9 (i.e., after processing the module TOP) that is a hierarchical box; i.e., a module instance.

At block 1004, the tool determines whether the defining module of the module instance that is currently being processed is associated with multiple instances. In one embodiment, the tool can determine if there are any instances of the module that have already been processed. In another embodiment, the tool can determine if there are multiple instances of the module in the circuit design representation, regardless of whether the other instances have been processed. With reference to FIG. 5 as an example, the tool determines whether the defining module of module instance F1:FLOP 524 is associated with multiple instances. Depending on the implementation, the tool can determine whether the module instance F2:FLOP 526 has already been processed, or will be processed. If the module is associated with multiple instances, i.e., if there are two or more instances of a given module in the same parent module (i.e., in the parent module TOP) of the current design, then the flow proceeds to block 1008. If the module is not associated with multiple instances, then the flow proceeds to block 1010 (i.e., the method of FIG. 11 via block "10A").

At block 1008, the tool determines whether the two instances of the same module share a common usage. The tool can make this determination is a variety of ways, such as by determining whether module instances of a register transfer level circuit design share a common usage, each instance being associated with a mapping. The two instances (e.g., F1 and F2) share the common usage if a sequence of signal transition representations received by the first instance can be mapped using a first mapping to the same common sequence of signal transition representations as a mapping of another sequence of signal transition representations received by the second instance using a second mapping. In one embodiment, during this determination, the tool also maps down the phase expression as received by the current instance to the inputs of the previously generated usage. If the tool determines that the first and second instances do not share a common usage, then the flow proceeds to block 1010 (i.e., the method of FIG. 11 via block "10A"). If the tool determines that the first and second instances share the common usage, then the flow proceeds to block 1012.

In one embodiment, instead of the determinations of blocks 1004 and 1008, the tool determines whether there is an existing usage of the defining module that is compatible with the first instance. The tool can test every existing usage (if any exist) of the defining module. Thus, with reference to FIG. 5 as an example, the tool can determine whether there is an existing usage of the defining module (e.g., FLOP 602) is that compatible with the first instance 524. If the tool determines that there is a compatible usage, then the flow proceeds to block 1012. If the tool determines that there is not a compatible usage, then the flow proceeds to block 1010.

At block 1012, the tool accesses the previously generated common usage. At block 1014, the tool updates the previously generated common usage. With reference to FIGS. 5 and 6, the tool can update any data structures associated with the common usage of FLOP module 602, including an indication that both F1:FLOP 524 and F2:FLOP 526 share the same usage.

At block 1016, the tool propagates the phases up using results of the phase expressions previously propagated through the common usage. Since the phase expression of the instance being processed does not need to be propagated through the common usage, the tool uses the results of a previous propagation (i.e., the propagation through the common usage that was previously performed for the second instance of the module) and uses the mappings (i.e., the mappings 550) to generate the phase expression for the output e.g., ADOUT 542. Once block 1016 is performed, the flow proceeds to block 1020 (i.e., to block 9B which corresponds to block 915 of FIG. 9). Block 1020 can also be accessed by block 10B 1018 (e.g., that is called from the flowchart of FIG. 11).

Figure 11:
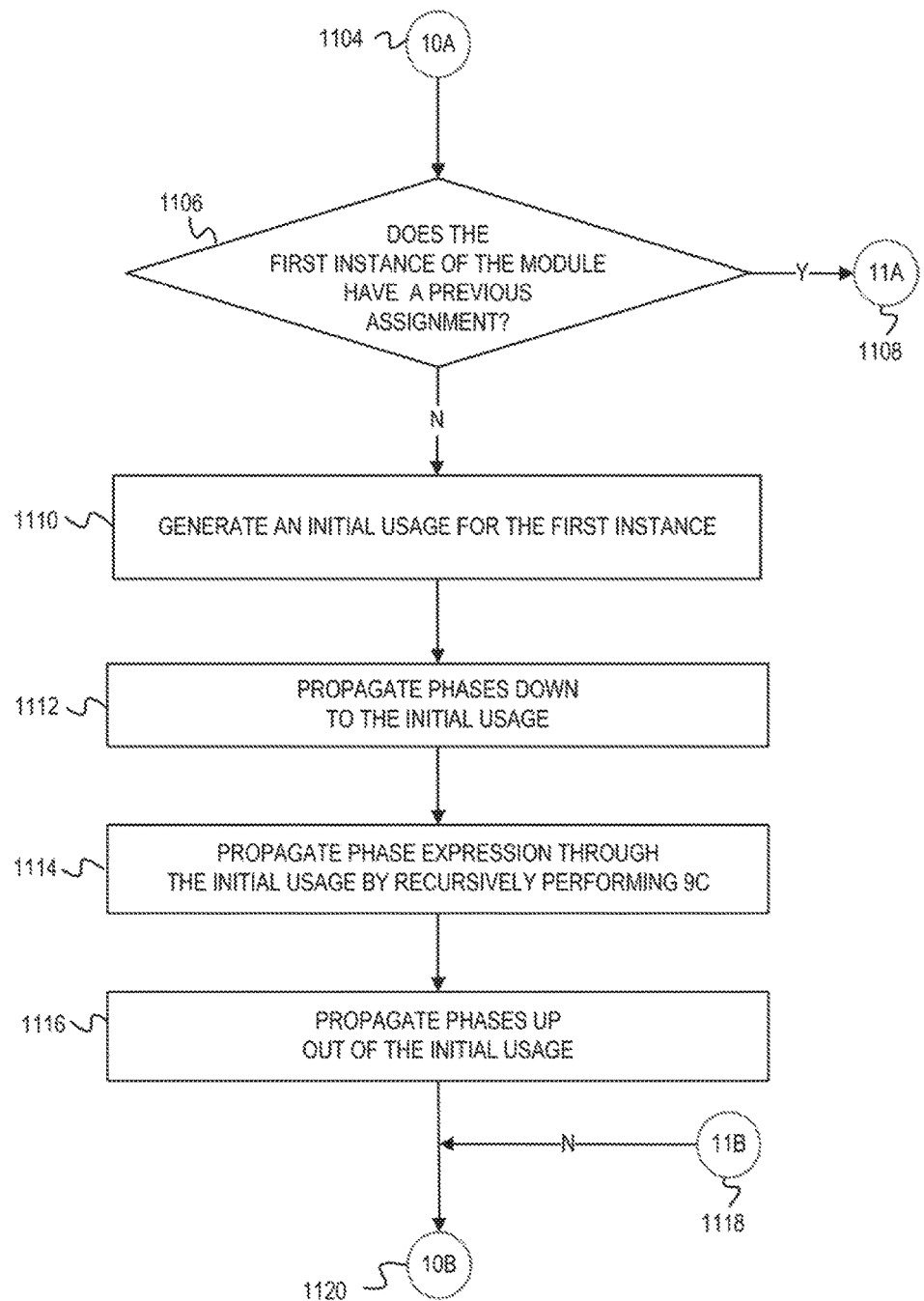

FIG. 11 is a flowchart of example operations for propagating multi-waveform representations through hierarchical modules.

At block 1104, the flowchart of FIG. 11 is accessed from block 10A of FIG. 10. At block 1106, the tool determines whether the first instance of the module has a previous assignment. With reference to FIG. 7 as an example, the tool determines whether F1:FLOP 724 has a previous assignment. The F1:FLOP 724 module has a previous assignment if there is a separate usage previously created for F1:FLOP 724 (i.e., different from usage 830 for F2:FLOP 726). If the first instance of the module has a previous assignment, then the flow proceeds to block 1108 (block labelled 11A which corresponds to performing the flowchart of FIG. 12). If the first instance does not have a previous assignment, then the flow proceeds to block 1110.

At block 1110, the tool generates an initial usage for the first instance. With reference to FIGS. 7 and 8 as examples, the tool generates FLOP-U1 usage, as FLOP-U2 usage is the other usage for the FLOP module that is not a common usage between the F1:FLOP 724 and F2:FLOP 726 instances of the FLOP module. Furthermore, the tool generates mappings 750 for the first instance.

At block 1112, the phases are propagated down to the initial usage. With reference to FIGS. 7 and 8, the phase expression "M->A@L:0" 714 is mapped down to the first usage 802 using the mappings 750. The mapped down phase expression is then ready to be propagated through the first usage 802.

At block 1114, the mapped down phase expression for the initial usage is propagated through the initial usage by recursively performing block 9C of FIG. 9. Thus, the flowchart of FIG. 9 can be called recursively for each hierarchical module being processed. The resultant propagated phase expression is output on the port 810 of the first usage 802.

At block 1116, the resultant propagated phase expression is then mapped up out of the initial usage. Thus, the resultant propagated phase expression is mapped up from the first usage 802 using mappings 750 to ADOUT of "M->A@LPGF:0" 742. Once block 1116 is performed, the flow proceeds to block 1120 (i.e., to block 10B which corresponds to block 1018 of FIG. 10). Block 1120 can also be accessed by block 11B 1118 that is called from the flowchart of FIG. 12.

Figure 12:
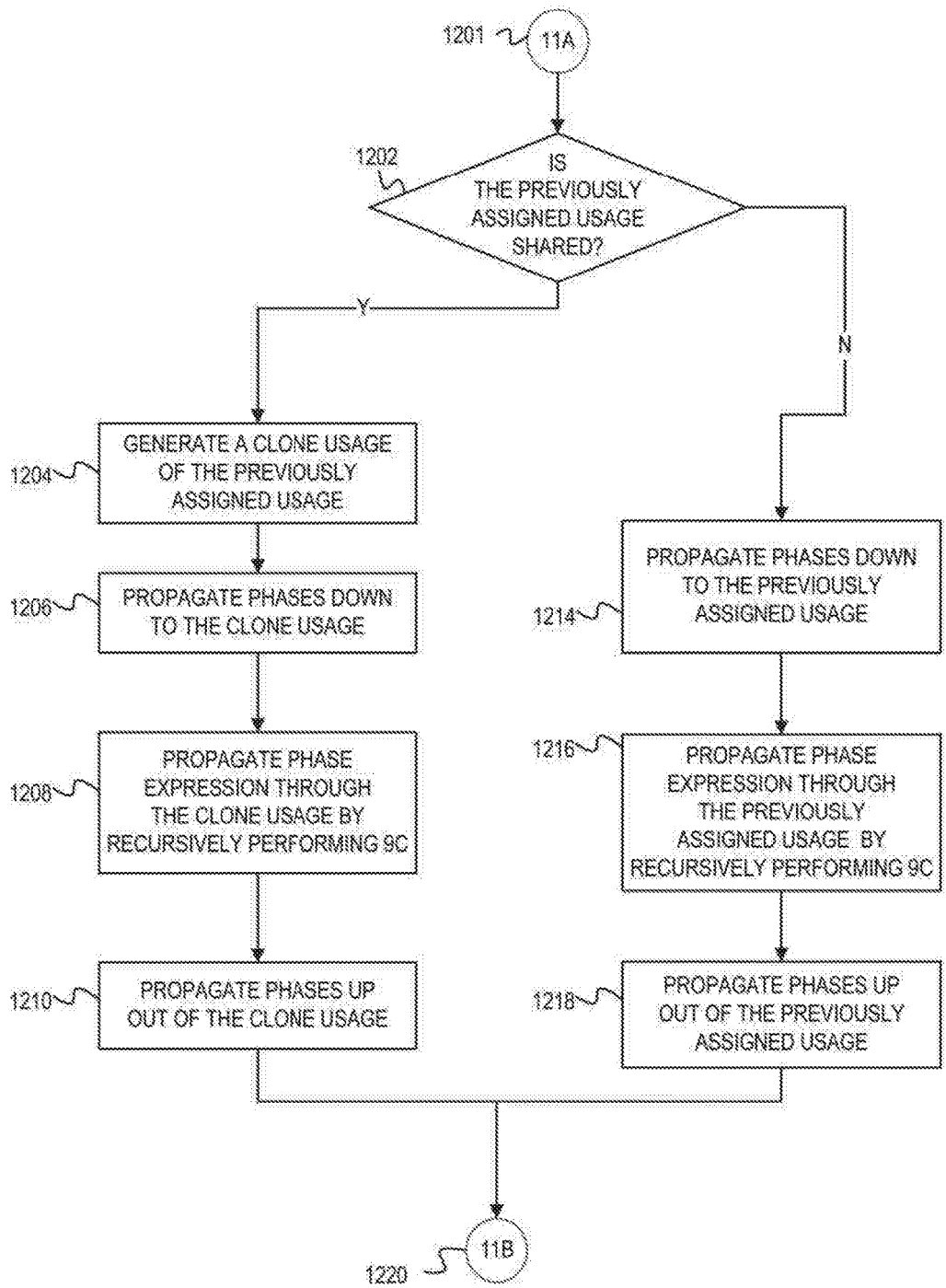

FIG. 12 is a flowchart of example operations for propagating multi-waveform representations through hierarchical modules.

At block 1201, the flowchart of FIG. 12 is accessed from block 11A of FIG. 11. At block 1202, the tool determines whether the previously assigned usage is shared. With reference to FIGS. 7 and 8, the tool determines whether the first usage 802 is shared with another instance (e.g., by a different instance from F2:FLOP instance 726). If the tool determines that the first usage is shared with another instance, the flow proceeds to block 1204. If the tool determines that the first usage is not shared with another instance, the flow proceeds to block 1214.

At block 1204, the tool generates a clone usage of the previously assigned usage. Thus, the tool generates a clone usage FLOP-U1-CLONE 850 of the first usage 802. The clone usage 850 is generated such that any subsequent changes to the first usage 802 would not affect phase expressions that have been already propagated through the clone usage 850. In other words, any subsequent changes to clone 850 will not affect the first usage 802.

At block 1206, the phases are propagated down to the clone usage. With reference to FIGS. 7 and 8, the phase expression "M->A@L:0" 714 is mapped down to the clone usage 850 using the mappings 750. The resultant mapped down phase expression is then ready to be propagated through the clone usage 850.

At block 1208, the mapped down phase expression is propagated through the clone usage by performing block 9C of FIG. 9. Thus, the flowchart of FIG. 9 can be called recursively for each hierarchical module being processed. The resultant propagated phase expression is output on the ports of the clone usage 850.

At block 1210, the resultant propagated phase expression is mapped up out of the clone usage. Thus, the resultant propagated phase expression is mapped up from the clone usage 850 using mappings 750 to ADOUT 742 of "M->A@LPGF:0". Once block 1210 is performed, the flow proceeds to block 1220 11B (i.e., to block 1020 of FIG. 10).

If the tool determines that the previously assigned usage is not shared, then blocks 1214-1218 are performed instead of blocks 1204-1210. Blocks 1214-1218 are similar to blocks 1206-1210, except that whereas blocks 1214-1218 operate on an existing non-shared usage, blocks 1206-1210 operate on a clone usage of the existing shared usage. Furthermore, blocks 1214-1218 are similar to blocks 1112-1116, except that whereas blocks 1214-1218 operate on an existing non-shared usage (i.e., the previously assigned usage), blocks 1112-1116 operate on an initial usage of a module instance.

At block 1214, the phases are propagated down to the non-shared usage. With reference to FIGS. 7 and 8, the phase expression "M->A@LPGF:0" 714 is mapped down to the non-shared (i.e., previously assigned) usage 802 using the mappings 750. The resultant mapped down phase expression is then ready to be propagated through the non-shared usage 802.

At block 1216, the mapped down phase expression is propagated through the non-shared usage by performing block 9C of FIG. 9. Thus, the flowchart of FIG. 9 can be called recursively for each hierarchical module being processed. The resultant propagated phase expression is output on the ports of the non-shared usage 802.

At block 1218, the resultant propagated phase expression is then mapped up out of the non-shared usage. Thus, the resultant propagated phase expression is mapped up from the non-shared usage 802 using mappings 750 to ADOUT 742 of "M->A@LPGF:0". Once block 1218 is performed, the flow proceeds to block 1220 11B (i.e., to block 1020 of FIG. 10).

In some embodiments, the propagation algorithm described above with reference to FIGS. 10-12 is divided into the following six named procedures.

create_initialized_usage
record_phase_id
propagate_through_usage
propagate_through_instance_box
propagate_phases_down
propagate_phases_up Each procedure is listed in a section below. In some embodiments, the procedures operate on associative data structures (data objects) that store data associated with the circuit design. An associative data structure stores data values that are each associated with a unique key. The procedures use the syntax associative_data_structure [key] to refer to the data value associated with the given key. A key may be compound, meaning, that it consists of a sequence of values. In the procedure listings, the term "iff" means "if and only if", and the characters "//" precede a comment. The algorithm is performed on a given hierarchical design by the following two-step pseudocode, which calls two of the named procedures:

Let top_usage_id=create_initialized_usage (top_level_module).

Call propagate_through_usage_(top_usage_id).

The propagate_through_usage procedure indirectly recursively calls itself for all the underlying usages in the design, propagating phase expressions through each. At the completion of the above pseudocode, phase expressions will be propagated to all nets in the hierarchical design.

Procedure create_initialized_usage—the following procedure creates a new usage of a module, and initializes the phase IDs for all nets in the module. It returns the ID of the new usage.

```
procedure create_initialized_usage
formal argument: module_id
returns: new usage_id
{
Let usage_id = a new, unused usage ID for the module referenced by module_id.
for each instance box in the module referenced by module_id
   {
   // Mark instance box as updated so it will be assigned a usage.
   Add instance box to module_updated_boxes [ module_id ].
   }
for each net in the module referenced by module_id
   {
   if ( net is driven by tie-down or tie-up)
      {
      Let phase_expr = "0" or "1", respectively.
      }
   else if ( net has been assigned a phase expression by the designer)
      {
      Let phase_expr = the given phase expression.
      For each virtual clock and mode referenced by phase_expr, add it to
      usage_virtual_clocks [usage_id] or usage_modes [usage_id], respectively.
      }
   else if ( net is connected to an input port and module_id refers to the top-level
   module )
      {
      Let phase_expr = "< >".
      }
   else if ( net is connected to the output of a clock generator )
      {
      Let phase_expr = "< >".
      }
   else
      {
      Let phase_expr = "-".
      }
   Call record_phase_id ( usage_id, net, phase ID corresponding to phase_expr ).
   } // end for each net
Return usage_id.
} // end procedure create_initialized_usage
```

Procedure record_phase_id—the following procedure is called whenever the phase ID assigned to a net is initialized or potentially updated. The net argument refers to one net (signal) within the module used by the usage_id argument. The purpose of this procedure is not only to record the net's phase ID, but to mark any downstream boxes or ports which may be affected by the net's update, so that they will subsequently be processed. The term "sink box" is used to mean any box (primitive component or instance box) that has an input pin connected to the given net.

```
procedure record_phase_id
formal arguments: usage_id, net, phase_id
{
Let module_id = ID of module used by usage_id (which contains the given net).
Let Boolean flag is update = false.
if ( usage_net_phase_id [ usage_id, net ] has not been initialized)
   {
   Set usage_net_phase_id [ usage_id, net ] equal to phase_id.
   Set is_update = true iff phase_id is not the phase ID for "-"
   }
else if ( usage_net_phase_id [ usage_id, net ] stores a value other than phase_id )
   {
   if ( net was assigned a phase expression by the designer)
      {// Leave phase ID assigned to net unchanged, but store conflict (to report
      error).
      Set usage_net_phase_id_conflict [ usage_id, net ] equal to phase_id.
      }
```

```
        else
           {
           Set usage_net_phase_id [ usage_id, net ] equal to phase_id.
           Set is_update = true.
           }
        }
     if( is_update is true)
        {
        for each sink box of net
           {
           Add sink box to module_updated_boxes [ module_id ].
           if ( sink box is an instance box)
              {
              Let input_pin = pin of instance box connected to net.
              Add input_pin to module_updated_instance_pins [ module_id, sink
              box ].
              }
           } // end for each sink box
        if( net is connected to an output port of the module referenced by module_id )
           {
           Add output port to module_updated_output_ports [ module_id ].
           Set usage_port_phase_id [ usage_id, output port ] equal to phase_id.
           }
        }
     } // end procedure record_phase_id
```

Procedure propagate_through_usage—the following procedure will propagate phase IDs through the specified usage, and will indirectly recursively call itself for each child usage, via the call to propagate_through_instance_box.

```
     procedure propagate_through_usage
     formal argument: usage_id
     {
     Let module_id = ID of module used by usage_id.
     // Propagate updates from above (via input ports), if any.
     for each input_port in module_updated_input_ports [ module_id ]
        {
        Call record_phase_id ( usage_id, net connected to input_port,
        usage_port_phase_id [ usage_id, input_port ] ).
        }
     Set module_updated_input_ports [ module_id ] equal to the empty set.
     // Propagate from boxes updated by initialization and propagation from input ports.
     Let source_set = module_updated_boxes [ module_id ].
     while ( source_set is not empty)
        {
        Set module_updated_boxes [ module_id ] to the empty set.
        for each box in source_set
           {
           if (box is primitive box)
              {
              Let phase_id = the phase ID evaluated for the box output as a func-
              tion of the phase IDs assigned to its input nets
              // (stored in usage_net_phase_id)
              Call record_phase_id ( usage_id, net connected to box output,
              phase_id ).
              }
           else
              { // box is instance box
              Call propagate_through_instance_box ( usage_id, box).
              }
           } // end for
        Set source_set equal to module_updated_boxes [ module_id ].
        } // end while
     } // end procedure propagate_through_usage
```

Procedure propagate_through_instance_box—the following sub-procedure is called by the previous propagation procedure to propagate phase IDs through an instance box. It in turn calls the previous procedure (indirect recursion) for the usage ID assigned to the instance box.

```
procedure propagate_through_instance_box
formal arguments: usage_id, instance_box
{
Let module_id = ID of instantiating module of instance_box (module used by usage_id)
Let child_module_id = ID of defining module of instance box.
Test each existing usage of module child_module_id for compatibility with instance_box
if ( found a compatible usage (and therefore a consistent virtual clock and mode map) )
    {
    Set usage_instance_box_usage [usage_id, instance_box] to the compatible usage's
    ID.
    for each virtual_clock_or_mode_name referenced by instance_box input phase
    expressions
        {
        Set usage_instance_box_map [usage_id, instance_box, vir-
        tual_clock_or_mode_name] to the lower-level virtual clock or mode, or its
        inversion, that was assigned by the consistent map found for the compati-
        ble usage (which may be an extension of a previous map, in which case
        some values will not change).
        }
    Set module_updated_instance_pins [ module_id, instance_box ] to the empty set.
    Add all output ports of child_module to module_updated_output_ports [
    child_module_id ].
    }
else {
    // There is no existing usage compatible with instance_box.
    if ( there is no usage already assigned to instance_box )
        {
        Let child_usage_id = create_initialized_usage (child_module_id).
        Set usage_instance_box_usage [usage_id, instance_box] = child_usage_id.
        }
    else
        {
        Let child_usage_id = usage_instance_box_usage [usage_id, in-
        stance_box].
        if ( child_usage_id is assigned to (shared by) any other instance in the de-
        sign)
            {
            Create a clone of child_usage_id by copying all data for child_us-
            age_id to a new previously unused usage ID for module
            child_module_id (see below).
            Set usage_instance_box_usage [usage_id, instance_box] to the ID
            of the clone.
            Set child_usage_id to the ID of the clone.
            }
        }
    Call propagate_phases_down ( usage_id, instance_box, child_usage_id ).
    Recursively call propagate_through_usage ( child_usage_id ).
    }
Call propagate_phases_up ( usage_id, instance_box, child_usage_id ).
} // end procedure propagate_through_instance_box
```

In one implementation, the copying all data means that, for each of the following data objects, for any entry indexed (in part) by the child_usage_id, the tool creates a duplicate entry that is instead indexed by the new, previously unused ID:

> usage_virtual_clocks
> usage_modes
> usage_instance_box_usage
> usage_instance_box_map
> usage_net_phase_id
> usage_net_phase_id_conflict
> usage_port_phase_id However, if no compatible usage is found, then no two instances of a module will share a usage.

Procedure propagate_phases_down—the following sub-procedure is called by propagate_through_instance_box to propagate phase IDs from the inputs of an instance box to the input ports of its assigned usage.

```
procedure propagate_phases_down
formal arguments: usage_id, instance_box, child_usage_id
{
Let module_id = ID of instantiating module of instance_box (module used by usage_id).
Let child_module_id = ID of defining module of instance_box (module used by child_us-
age_id).
for each input_pin in module_updated_instance_pins [ module_id, instance_box ]
   {
   Let phase_id = usage_net_phase_id [ usage_id, net connected to input_pin ].
   Let child_input_port = input port of child_module corresponding to input_pin.
   for each virtual_clock_or_mode_name referenced by phase_id
      {
      if ( virtual_clock_or_mode_name has not been mapped for this instance
      box )
         {
         Let from_above_name = next available from-above name for
         child_usage_id
         // (e.g., /\C1, /\C2, for virtual clocks; /\M1, /\M2, for modes).
         Add from_above_name to usage_virtual_clocks [child_usage_id]
         or usage_modes [child_usage_id], as appropriate.
         Set usage_instance_box_map [usage_id, instance_box, vir-
         tual_clock_or_mode_name] = from_above_name.
         }
      }
   Let child_phase_id = mapping of phase_id down to the child usage
   Set usage_port_phase_id [ child_usage_id, child_input_port ] equal to
   child_phase_id.
   Add child_input_port to module_updated_input_ports [ child_module_id ].
   }
Set module_updated_instance_pins [ module_id, instance_box ] to the empty set.
} // end procedure propagate_phases_down
```

Procedure propagate_phases_up—the following sub-procedure is called by propagate_through_instance_box to propagate phase IDs from the output ports of the usage assigned to an instance box, to the nets connected to the outputs of the instance box.

```
procedure propagate_phases_up
formal arguments: usage_id, instance_box, child_usage_id
{
Let child_module_id = ID of defining module of instance_box (module used by child_us-
age_id).
for each child_output_port in module_updated_output_ports [ child_module_id ]
   {
   Let child_phase_id = usage_port_phase_id [ child_usage_id, child_output_port ].
   for each child_virtual_clock_or_mode_name referenced by child_phase_id that
   has not been mapped for this instance box (thus has origin of from_current or
   from_below)
      {
      Let from_below_name = virtual clock or mode name for usage_id, corre-
      sponding to child_virtual_clock_or_mode_name (prepended with instance
      name if virtual clock or mode originates from below)
      Add from_below_name to usage_virtual_clocks [usage_id] or us-
      age_modes [usage_id], as appropriate.
      Set usage_instance_box_map [usage_id, instance_box, from_be-
      low_name] = child_virtual_clock_or_mode_name.
      }
   Let phase_id = mapping of child_phase_id up to the current usage (usage_id)
   Let output_net = net connected to output pin of instance_box corresponding to
   child_output_port.
   Call record_phase_id ( usage_id, output_net, phase_id ).
   }
Set module_updated_output_ports [ child_module_id ] to the empty set
} // end procedure propagate_phases_up
```

Figure 13:
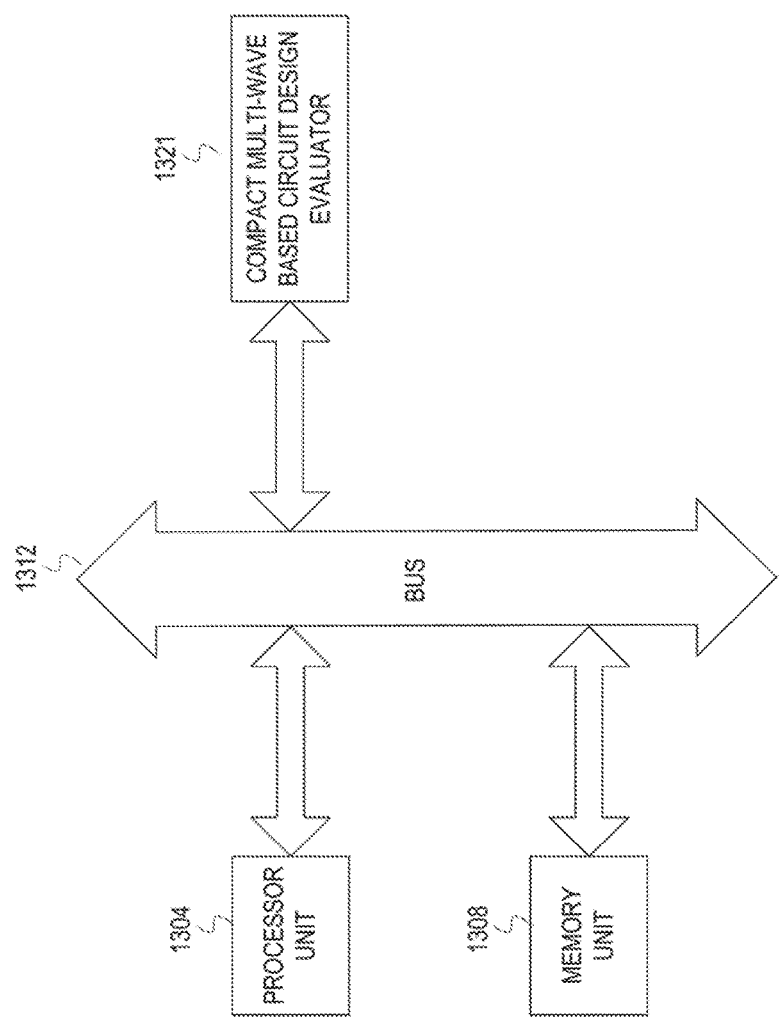
FIG. 13 depicts an example computer system including a compact multi-wave based circuit design evaluator.

FIG. 13 depicts an example computer system compact multi-wave based circuit design evaluator. A computer system includes a processor unit 1304 (possibly including multiple processors, multiple cores, multiple nodes, and/or implementing multi-threading, etc.). The computer system includes a memory unit 1308. The memory unit 1308 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 1312 (e.g., PCI bus, ISA bus, PCI-Express bus, HyperTransport® bus, InfiniBand® bus, NuBus, etc.). The computer system also includes a compact multi-wave based circuit design evaluator ("evaluator") 1321. The evaluator propagates compact representations of multiple waveforms throughout nets of a register level circuit design representation as previously described. The memory unit 1308 may include one or more functionalities that facilitate storing the look-up tables or other data structures for evaluating a circuit design representation based on representations of multiple waveforms and decomposition of compact multi-waveform representations into sequence of nondeterministic signal transition representations. Any one of these functionalities may be partially (or entirely) implemented in hardware and/or on the processor unit 1304. For example, the functionality may be implemented with an application specific integrated circuit, in logic implemented in the processor unit 1304, in a co-processor on a peripheral device or card, etc. The processor unit 1304 and the memory unit 1308 are coupled to the bus 1312. Although illustrated as being coupled to the bus 1312, the memory unit 1308 may be coupled to the processor unit 1304.

While the embodiments are described with reference to various implementations and exploitations, it will be understood that these embodiments are illustrative and that the scope of the inventive subject matter is not limited to them. In general, techniques for evaluating a register level circuit design representation with compact multi-waveform representations as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the example configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A computer-implemented method for evaluating, by a circuit evaluator operating via one or more processors, a circuit design having a compact representation of waveforms without simulating individual waveforms, the method comprising:
   determining, by the circuit evaluator operating via the one or more processors, a first mapping associated with a first instance of a first module of a machine readable circuit design and a second mapping associated with a second instance of the first module, wherein
      the first mapping is for mapping a first input sequence of signal transition representations received by the first instance to a common sequence of signal transition representations, and
      the second mapping is for mapping a second input sequence of signal transition representations received by the second instance to the common sequence;
   determining, by the circuit evaluator operating via the one or more processors, whether the first instance and the second instance share a common usage associated with a result sequence of signal transition representations that was generated by a previous propagation of the common sequence through the common usage, and
      each signal transition representation represents a nondeterministic transition from a previous signal state to a set of one or more possible signal states; and
   in response to determining that the first instance and the second instance share the common usage, mapping the result sequence of signal transition representations to an output sequence of signal transition representations for the second instance using the second mapping.

2. The method of claim 1, wherein
the previous propagation of the mapped first input sequence comprises,
   propagating the common sequence through the common usage to generate the result sequence of signal transition representations, wherein
      the result sequence of signal transition representations is for mapping to a first output sequence of signal transition representations for the first instance using the first mapping, and
      the result sequence of signal transition representations is for mapping to a second output sequence of signal transition representations for the second instance using the second mapping.

3. The method of claim 1, wherein
the first mapping maps one or more of:
   a clock of the first input sequence to a clock of the common sequence, and
   a mode of the first input sequence to a mode of the common sequence.

4. The method of claim 1, wherein
the common sequence is generated based on the first mapping prior to said determining whether the first instance and the second instance share the common usage.

5. The method of claim 1, wherein
said determining whether the first instance and the second instance share the common usage comprises,
   determining a plurality of second mapping candidates for mapping the second input sequence to the common sequence, and
   determining the second mapping from the plurality of second mapping candidates.

6. The method of claim 5, further comprising,
eliminating one or more of the plurality of second mapping candidates prior to said determining the second mapping from the plurality of second mapping candidates.

7. The method of claim 1, further comprising:
in response to determining that the first instance and the second instance do not share the common usage,
   determining whether the second instance is associated with an existing assignment of another usage of the first module; and
in response to determining that the second instance is not associated with the existing assignment of another usage,
   generating an initial usage of the first module,
   mapping the second input sequence to an initial sequence of signal transition representations using an initial mapping, and
   propagating the initial sequence through the initial usage to generate an initial result sequence of signal transition representations.

8. The method of claim 7, further comprising:
in response to determining that the second instance is associated with the existing assignment of another usage,
   determining whether the another usage is shared with another instance of the first module; and
in response to determining that the another usage is shared, generating a clone usage of the another usage, mapping the second input sequence to a clone sequence of signal transition representations using a clone mapping, and propagating the clone sequence through the clone usage to generate a clone result sequence of signal transition representations.

9. The method of claim 8, further comprising:

in response to determining that the another usage is not shared, mapping the second input sequence to a shared sequence of signal transition representations using a third mapping, and propagating the shared sequence through a shared usage to generate a shared result sequence of signal transition representations.

\* \* \* \* \*